(12) United States Patent  
Liu

(10) Patent No.: US 12,379,936 B2  
(45) Date of Patent: Aug. 5, 2025

(54) METHOD AND APPARATUS FOR IDENTIFYING PERIPHERAL CONFIGURATION OF SERVER, METHOD AND APPARATUS FOR LAYING OUT PERIPHERAL SILKSCREEN, AND SERVER

(71) Applicant: SUZHOU METABRAIN INTELLIGENT TECHNOLOGY CO., LTD., Jiangsu (CN)

(72) Inventor: Yang Liu, Jiangsu (CN)

(73) Assignee: SUZHOU METABRAIN INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 18/878,641

(22) PCT Filed: Nov. 21, 2023

(86) PCT No.: PCT/CN2023/133031  
§ 371 (c)(1),  
(2) Date: Dec. 23, 2024

(87) PCT Pub. No.: WO2024/183337  
PCT Pub. Date: Sep. 12, 2024

(65) Prior Publication Data  
US 2025/0173158 A1 May 29, 2025

(30) Foreign Application Priority Data  
Mar. 9, 2023 (CN) .......................... 202310220527.4

(51) Int. Cl.  
*G06F 9/4401* (2018.01)  
*B41J 3/407* (2006.01)  
*G06F 13/10* (2006.01)

(52) U.S. Cl.  
CPC .......... *G06F 9/4411* (2013.01); *G06F 13/102* (2013.01); *B41J 3/4075* (2013.01); *G06F 2213/0026* (2013.01)

(58) Field of Classification Search  
CPC ................. G06F 9/4411; G06F 13/102; G06F 2213/0026; B41J 3/4075  
See application file for complete search history.

(56) References Cited

U.S. PATENT DOCUMENTS 8,484,447 B2 * 7/2013 Chang ................. G06F 13/4068  
 713/1  
2007/0043882 A1 * 2/2007 Natarajan ............. G06F 9/4411  
 710/8

(Continued)

FOREIGN PATENT DOCUMENTS

CN 102098309 A 6/2011  
CN 109828798 A 5/2019

(Continued)

OTHER PUBLICATIONS

International Search Report for International Patent Application No. PCT/CN2023/133031 (Feb. 22, 2024).

(Continued)

*Primary Examiner* — Nimesh G Patel  
(74) *Attorney, Agent, or Firm* — Merchant & Gould P.C.

(57) ABSTRACT

Disclosed are a method and apparatus for identifying peripheral configuration of server, a method and apparatus for laying out peripheral silkscreen, and a server. The method includes: determining a PCIE external interface of each central processing unit on the basis of configuration requirement information of a server to be identified; determining, in sequence according to a level state of each peripheral ID signal transmitted by each PCIE external interface, a peripheral type that is capable of being configured for a peripheral bandwidth corresponding to the peripheral ID signal, allo- (Continued)

cating corresponding serial numbers to peripherals of different peripheral types, generating a peripheral silkscreen including all peripheral sequences managed by the server to be identified; sending the peripheral silkscreen to a basic input output system and/or a baseboard management controller, and allowing the basic input output system and/or the baseboard management controller to unify respective default silkscreen into the peripheral silkscreen.

20 Claims, 3 Drawing Sheets

(56) References Cited

U.S. PATENT DOCUMENTS

| | | | | |
|---|---|---|---|---|
| 2014/0136777 | A1* | 5/2014 | Davis | G06F 3/0689 |
| | | | | 711/114 |
| 2015/0186161 | A1* | 7/2015 | Cho | G06F 9/4401 |
| | | | | 713/2 |
| 2017/0168849 | A1* | 6/2017 | He | G06F 9/4401 |
| 2020/0394076 | A1* | 12/2020 | Chan | G06F 13/4282 |

FOREIGN PATENT DOCUMENTS

| | | |
|---|---|---|
| CN | 109933376 A | 6/2019 |
| CN | 110399280 A | 11/2019 |
| CN | 112732615 A | 4/2021 |
| CN | 113407397 A | 9/2021 |
| CN | 115904884 A | 4/2023 |
| KR | 20200059433 A | 5/2020 |

OTHER PUBLICATIONS

Written Opinion for International Patent Application No. PCT/CN2023/133031 (Feb. 22, 2024).
Chinese Search Report received for CN Application No. 2023102205274 accessed Dec. 17, 2024, 2 pgs.
Chinese Search Report received for CN Application No. 202310220527 accessed Dec. 17, 2024, 1 pg.

* cited by examiner

METHOD AND APPARATUS FOR IDENTIFYING PERIPHERAL CONFIGURATION OF SERVER, METHOD AND APPARATUS FOR LAYING OUT PERIPHERAL SILKSCREEN, AND SERVER

CROSS-REFERENCE TO RELATED APPLICATION

The disclosure is a national stage filing under 35 U.S.C. § 371 of international application number PCT/CN2023/133031, filed Nov. 21, 2023, which claims the priority of Chinese Patent Disclosure No. 202310220527.4, filed with the China Patent Office on Mar. 9, 2023 and entitled "Method and apparatus for identifying peripheral configuration of server, method and apparatus for laying out peripheral silkscreen, and server", which is incorporated in its entirety herein by reference.

TECHNICAL FIELD

The disclosure relates to the technical field of servers, and particularly relates to a method and apparatus for identifying peripheral configuration of a server, a method and apparatus for laying out peripheral silkscreen, and server.

BACKGROUND

In server applications, one product model is generally compatible with a variety of configurations. Different configurations probably vary in case types for supporting different numbers of hard disks. In particular models, some servers support Tri-mode, that is, anybay. Anybay means that a hard disk backboard on a server can support mounting of different types of hard disks such as a serial advanced technology attachment (SATA) (a solid state disk with a serial ATA (SATA) interface)/a non-transitory memory express (NVME, a hard disk based on a peripheral component interconnect express (PCI Express) protocol).

To satisfy flexible requirements of services, hardware is required to be flexibly adapted to support requirements such as mixed matching and configuration reduction of hard disks. In common designs, management software of a basic input output system (BIOS) is required to identify a current configuration, identify and allocate bandwidths of peripherals connected through peripheral component interconnect express (PCIE), allocate BIOS silkscreen to the peripherals, and display device silkscreen on an execution interface of the BIOS. Moreover, basic information of a device is transmitted to a baseboard management controller (BMC), such that the BMC prints location information of the device on a device list interface of WEB, and software and hardware corresponding is performed.

According to a method for identifying a configuration used in the related art, an identity (ID) [1:0] signal is required to be set in a high-speed connector on a mainboard from which a PCIE cable is led out. All signals are pulled down on the mainboard. Pull-up and pull-down are adjusted on the hard disk backboard or a PCIE riser backboard according to a bandwidth of a PCIE peripheral. If an ID [1:0] level on an Amphenol mini cool edge IO (MCIO) connector is 00, it is represented that a current PCIE peripheral has a x4 bandwidth (a nvme hard disk). Moreover, 01 represents an x8 bandwidth (riser card), 10 represents a x16 bandwidth (riser card), and 11 represents no connection. Further, an identification code of the current configuration is formed according to a peripheral ID signal combination, such that BIOS software determines the current configuration according to the identification code, allocates PCIE bandwidths, and allocates silkscreen of peripherals connected to corresponding interfaces in the BIOS.

According to a current detailed identification solution, to satisfy mixed matching and configuration reduction of hard disks, a matrix having different matching generated according to a hard disk type and number is required to be sorted out for each model. An overall design is required to cover all possible configurations for detailed sorting. Numbers of every types of hard disks are listed. A unique identification code is required to be generated for each case such that the BIOS can accurately display a silkscreen of the current configuration. Configurations after splitting will generate hundreds of identification combinations, which is difficult to achieve in theory and is also impossible to achieve in reality because of cost. However, the method for identifying a configuration is not suitable for a case that a user requires flexible configurations. Thus, the method for identifying a configuration in the related art cannot satisfy an application scenario in which mixed insertion of hard disks exits in a server, resulting in low efficiency and feasibility of configuration identification.

SUMMARY

The disclosure provides a method and apparatus for identifying peripheral configuration of server, a method and apparatus for laying out peripheral silkscreen, and a server, which are used to overcome defects that a method for identifying a configuration in the related art cannot satisfy an application scenario in which mixed insertion of hard disks exits in a server, resulting in low efficiency and feasibility of configuration identification.

The disclosure provides a method for identifying peripheral configuration of server. The method includes:
  determining a peripheral component interconnect express (PCIE) external interface of each central processing unit on the basis of configuration requirement information of a server to be identified, where the server to be identified is configured with an anybay hard disk interface; and the configuration requirement information includes at least configuration information of the central processing unit and design requirement information of the hard disk interface;
  determining, in sequence according to a level state of each peripheral identity (ID) signal transmitted by each PCIE external interface, a peripheral type that is capable of being configured for a peripheral bandwidth corresponding to the peripheral ID signal, allocating corresponding serial numbers to peripherals of different peripheral types, and generating a peripheral silkscreen including all peripheral sequences managed by the server to be identified; and sending the peripheral silkscreen to a basic input output system and/or a baseboard management controller, and allowing the basic input output system and/or the baseboard management controller to unify respective default silkscreen into the peripheral silkscreen.

According to the method for identifying peripheral configuration of server provided in the disclosure, the determining, in sequence according to a level state of each peripheral ID signal transmitted by each PCIE external interface, a peripheral type that is capable of being configured for a peripheral bandwidth corresponding to the peripheral ID signal, allocating corresponding serial numbers to peripherals of different peripheral types, and generating a peripheral silkscreen including all peripheral sequences managed by the server to be identified include:

traversing design requirement information of each hard disk interface in all servers to be identified, and obtaining a slot number and location of an anybay hard disk interface in each server to be identified, and a slot silkscreen of each server to be identified in the basic input output system;

determining, according to all peripheral ID signals transmitted in each server to be identified and through a corresponding relation between the peripheral ID signals and peripheral bandwidths, a peripheral type supported by each server to be identified;

configuring slot numbers of peripherals having peripheral types of non-transitory memory express (nvme) of all the servers to be identified from a target PCIE external interface of a target central processing unit, where configuring implementation steps are as follows:

configuring a PCIE external interface set having N PCIE external interfaces in sequence from the target PCIE external interface on the basis of slot numbers and locations of anybay hard disk interfaces in the servers to be identified; and allocating slot numbers of peripherals having peripheral types of nvme for each PCIE external interface in the PCIE external interface set as 0 to M in sequence, filling corresponding silkscreen templates with the allocated slot numbers in sequence, and generating peripheral silkscreen of the peripherals having the peripheral types of nvme; wherein M is a positive integer, and M represents a number of nvme hard disks supported by a configuration that supports most nvme hard disks after configurations of all the servers to be identified are traversed; N is a positive integer, and N represents a number of PCIE external interfaces of the central processing unit used by a configuration that supports most nvme hard disks after configurations of all servers are traversed; a corresponding relation between N and M is determined according to a number of buses of PCIE supported by each PCIE external interface of the central processing unit, and a value of N is deduced after a value of M is determined; and a PCIE external interface set configured by a server to be identified and having fewer peripherals having peripheral types of nvme is a subset of a PCIE external interface set configured by a server to be identified and having more peripherals having peripheral types of nvme.

According to the method for identifying peripheral configuration of server provided in the disclosure, the configuring a PCIE external interface set having N PCIE external interfaces in sequence from the target PCIE external interface on the basis of slot numbers and locations of anybay hard disk interfaces in the servers to be identified includes:

distributing the N PCIE external interfaces in the PCIE external interface set in the central processing units evenly.

According to the method for identifying peripheral configuration of server provided in the disclosure, after the peripheral bandwidth of each peripheral of the PCIE external interface is determined on the basis of the peripheral ID signal, the method further includes:

identifying, in a case that it is determined two peripherals having a same peripheral bandwidth but different peripheral silkscreen exit at the currently identified PCIE external interface, the peripheral configuration according to peripheral ID signals transmitted by remaining PCIE external interfaces, and allocating a peripheral silkscreen to the currently identified PCIE external interface.

According to the method for identifying peripheral configuration of server provided in the disclosure, the peripheral bandwidths are divided according to the peripheral types.

The peripheral types include an nvme hard disk corresponding to a peripheral bandwidth of x4, a riser hard disk corresponding to a peripheral bandwidth of x8, a riser hard disk or an open compute project (OCP) hard disk corresponding to a peripheral bandwidth of x16, and a null value.

According to the method for identifying peripheral configuration of server provided in the disclosure, the peripheral silkscreen are determined according to the peripheral types.

The peripheral silkscreen include an nvme silkscreen corresponding to peripheral type nvme, and PCIE slot silkscreen corresponding to peripheral types other than the nvme.

The disclosure further provides a method for laying out peripheral silkscreen. The method includes:

acquiring peripheral configuration information of each PCIE external interface on the basis of any one of the above methods for identifying peripheral configuration of server; and generating a silkscreen distribution situation on the basis of a peripheral silkscreen carried in the peripheral configuration information of each PCIE external interface.

According to the method for laying out peripheral silkscreen provided in the disclosure, the generating a silkscreen distribution situation on the basis of a peripheral silkscreen carried in the peripheral configuration information of each PCIE external interface includes:

generating first arrangement and distribution and second arrangement and distribution in a horizontal direction on the basis of configuration requirement information of a server to be identified and an nvme silkscreen included in the peripheral silkscreen respectively; and splicing the first arrangement and distribution and the second arrangement and distribution vertically, and generating the silkscreen distribution situation.

According to the method for laying out peripheral silkscreen provided in the disclosure, the generating first arrangement and distribution and second arrangement and distribution in a horizontal direction on the basis of configuration requirement information of a server to be identified and an nvme silkscreen included in the peripheral silkscreen respectively includes:

determining a first distribution range and a second distribution range on the basis of the configuration requirement information;

carrying out filling from 0 in sequence from left to right in the first distribution range, and generating the first arrangement and distribution; and filling the second distribution range with slot numbers in the nvme silkscreen in sequence from left to right, and generating the second arrangement and distribution.

A number of layout units included in the first distribution range is determined according to a total number of case slots included in the configuration requirement information. An initial layout unit of the second distribution range is aligned with a target layout unit in the first distribution range vertically. The target layout unit is determined according to a case slot corresponding to a first anybay hard disk interface in the server to be identified.

According to the method for laying out peripheral silkscreen provided in the disclosure, after the generating a silkscreen distribution situation on the basis of a peripheral silkscreen carried in the peripheral configuration information of each PCIE external interface, the method further includes:

generating a silkscreen layout diagram on the basis of the silkscreen distribution situation; and transmitting the silkscreen layout diagram to a printing and outputting device, and allowing the printing and outputting device to print and output the silkscreen layout diagram in a form of a label sticker.

The label sticker is used to be attached to a surface of a case ear plate of the server to be identified to indicate a peripheral configuration of the server to be identified.

According to the method for laying out peripheral silkscreen provided in the disclosure, the generating a silkscreen layout diagram on the basis of the silkscreen distribution situation includes:

setting different font colors for the first arrangement and distribution and the second arrangement and distribution in the silkscreen distribution situation;

generating, in a case that it is determined that the configuration requirement information indicates that all hardware interfaces in the server to be identified are anybay hard disk interfaces, longitudinal partitions corresponding, in number, to central processing units (CPUs) of the server to be identified in the canvas; and filling the corresponding first arrangement and distribution and second arrangement and distribution with different font colors in each longitudinal partition, and generating the silkscreen layout diagram.

According to the method for laying out peripheral silkscreen provided in the disclosure, after the setting different font colors for the first arrangement and distribution and the second arrangement and distribution in the silkscreen distribution situation, the method further includes:

generating, in a case that it is determined that the configuration requirement information indicates that at least one hardware interface in the server to be identified is not an anybay hard disk interface, independent partitions corresponding to layout units of the first arrangement and distribution in number in the canvas;

filling the independent partitions with elements in the first arrangement and distribution in sequence after the font colors are set; and filling the independent partitions from a target independent partition to a last independent partition with elements in the second arrangement and distribution in sequence after the font colors are set, and generating the silkscreen layout diagram.

The target independent partition is an independent partition corresponding to a target layout unit in the first arrangement and distribution.

According to the method for laying out peripheral silkscreen provided in the disclosure, after the generating a silkscreen layout diagram on the basis of the silkscreen distribution situation, the method further includes:

establishing a label partition below the silkscreen layout diagram in a case that it is determined according to the configuration requirement information that the server to be identified is configured with only one hardware interface; and setting corresponding label content in the label partition according to a type of the configured hardware interface.

The disclosure further provides an apparatus for identifying peripheral configuration of server. The apparatus includes:

a port identifying module configured to determine a PCIE external interface of each central processing unit on the basis of configuration requirement information of a server to be identified, where the server to be identified is configured with an anybay hard disk interface; and the configuration requirement information includes at least configuration information of the central processing unit and design requirement information of the hard disk interface;

a configuration identifying module configured to determine, in sequence according to a level state of each peripheral ID signal transmitted by each PCIE external interface, a peripheral type that is capable of being configured for a peripheral bandwidth corresponding to the peripheral ID signal, allocate corresponding serial numbers to peripherals of different peripheral types, and generate a peripheral silkscreen including all peripheral sequences managed by the server to be identified; and a silkscreen synchronizing module configured to send the peripheral silkscreen to a basic input output system and/or a baseboard management controller, and allow the basic input output system and/or the baseboard management controller to unify respective default silkscreen into the peripheral silkscreen.

The disclosure further provides an apparatus for laying out peripheral silkscreen. The disclosure includes:

a configuration acquiring module configured to acquire peripheral configuration information of each PCIE external interface on the basis of any one of the above methods for identifying peripheral configuration of server; and a silkscreen layout module configured to generate a silkscreen distribution situation on the basis of a peripheral silkscreen carried in the peripheral configuration information of each PCIE external interface.

The disclosure further provides a server. The server includes a server body. The server body includes a basic input output system and a baseboard management controller. The basic input output system is configured to implement any one of the above methods for identifying peripheral configuration of server.

The baseboard management controller is configured to receive peripheral configuration information identified by the basic input output system, and carry out unification by using a peripheral silkscreen carried in the peripheral configuration information.

The disclosure further provides an electronic device. The electronic device includes a memory, a processor and a computer program stored in the memory and operable on the processor. When the processor executes the program, any one of the above methods for identifying peripheral configuration of server or any one of the above methods for laying out peripheral silkscreen is implemented.

The disclosure further provides a non-transitory readable storage medium. The non-transitory readable storage medium stores a computer program. When the computer program is executed by a processor, any one of the above methods for identifying peripheral configuration of server or any one of the above methods for laying out peripheral silkscreen is implemented.

The disclosure further provides a computer program product. The computer program product includes a computer program. When the computer program is executed by a processor, any one of the above methods for identifying peripheral configuration of server or any one of the above methods for laying out peripheral silkscreen is implemented.

According to the method and apparatus for identifying peripheral configuration of server, the method and apparatus for laying out peripheral silkscreen, and the server provided in the disclosure, a distribution situation of the PCIE external interface of each central processing unit is determined on the basis of configuration requirement information of the server. Through peripheral configuration information represented by a peripheral ID signal of each PCIE external interface in all configurations, process element (PE) ports of each CPU are uniformly allocated to same BIOS setup silkscreen and baseboard management controller (BMC) web silkscreen. Software silkscreen of a server having an anybay hard disk interface can be uniformly processed in cases of different models and configurations such that a situation that a software configuration is too complicated can be avoided. Even in the face of flexible requirements such as mixed insertion and configuration reduction of hard disks, the disclosure can be fully adapted, and efficiency and feasibility of peripheral configuration identification can be improved.

BRIEF DESCRIPTION OF THE DRAWINGS

To describe technical solutions in the disclosure or in the prior art more clearly, accompanying drawings required to be used in descriptions of embodiments or the prior art will be briefly introduced below. Apparently, the accompanying drawings in the following descriptions only show some embodiments of the disclosure. Those of ordinary skill in the art would also be able to derive other accompanying drawings according to these accompanying drawings without creative efforts.

DETAILED DESCRIPTION OF THE EMBODIMENTS

To make objectives, technical solutions and advantages of the disclosure clearer, technical solutions of the disclosure will be clearly and completely described below in combination with accompanying drawings in the disclosure. Apparently, the described embodiments are embodiments rather than all embodiments of the disclosure. On the basis of embodiments of the disclosure, all other embodiments derived by those of ordinary skill in the art without creative efforts all fall within the scope of protection of the disclosure.

The terms "first", "second", etc. in the disclosure are used to distinguish between similar objects, but are not used to describe a specific sequence or order. It should be understood that data so used can be interchanged under appropriate circumstances such that embodiments of the disclosure can be implemented in sequence other than those illustrated or described herein. Moreover, the objects distinguished by "first" and "second" generally belong to one type. The number of objects is not limited. For instance, one or more first objects can be arranged.

It should be understood that terms used in the description of the disclosure are merely for the purpose of describing particular embodiments and are not intended to limit the disclosure. As used in the disclosure, singular forms such as "a", "an" and "the" are intended to include plural forms, unless otherwise clearly stated in the context.

The terms "comprise" and "include" indicate the presence of described features, integers, steps, operations, elements, and/or components, but do not preclude the presence or addition of one or more other features, integers, steps, operations, elements, components, and/or their sets.

Figure 1:
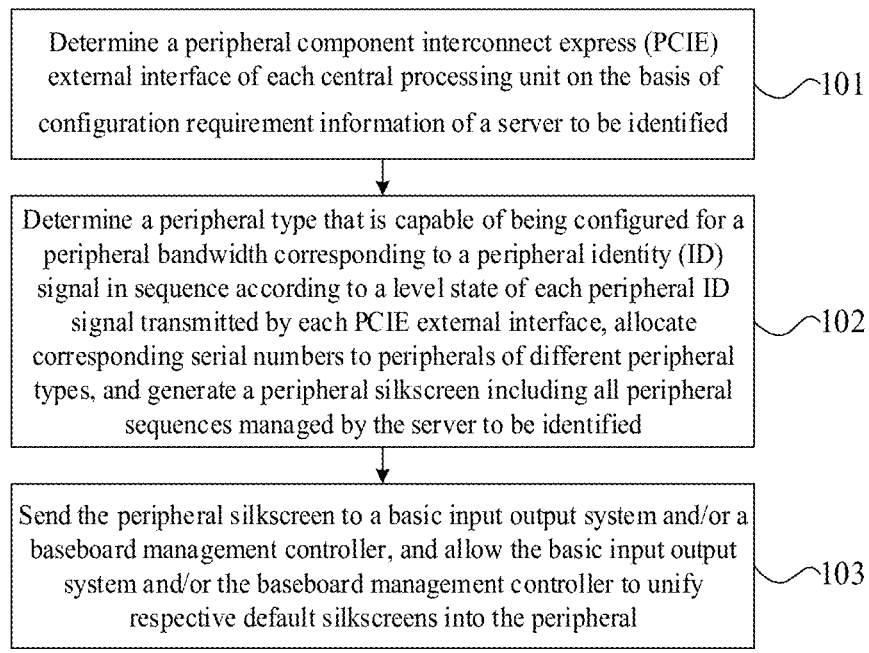
FIG. 1 is a schematic flow diagram of a method for identifying peripheral configuration of server according to embodiments of the disclosure.

FIG. 1 is a schematic flow diagram of a method for identifying peripheral configuration of server according to embodiments of the disclosure. As shown in FIG. 1, the method for identifying peripheral configuration of server provided in an embodiment of the disclosure includes: step 101: a peripheral component interconnect express (PCIE) external interface of each central processing unit is determined on the basis of configuration requirement information of a server to be identified.

The server to be identified is configured with an anybay hard disk interface. The configuration requirement information includes at least configuration information of the central processing unit and design requirement information of the hard disk interface.

It should be noted that an execution subject of the method for identifying peripheral configuration of server provided in an embodiment of the disclosure is an apparatus for identifying peripheral configuration of server arranged in the server.

An application scenario of the method for identifying peripheral configuration of server provided in an embodiment of the disclosure is as follows: after a basic input output system (BIOS) of a server starts working, starting with PCIE external interfaces of central processing units (CPUs), all situations that a PCIE external interface of each CPU is required to support a peripheral in all configurations of a current server product are listed.

It should be noted that before step 101, a user is required to specify configuration requirement information of the server to be identified according to actual design requirements.

The configuration requirement information includes but is not limited to the configuration information of the central processing unit and the design requirement information of the hard disk interface.

The configuration information of the central processing unit may be information about a configuration situation of the CPU in the server to be identified. For instance, the configuration information of the central processing unit may indicate that the server to be identified is a dual-socket server. That is, two CPU slots are provided on a mainboard. The two CPUs run simultaneously for working. The configuration information of the central processing unit may indicate that the server to be identified is a single-socket server. That is, only one CPU slot is provided on a mainboard. Only this CPU runs for working.

The design requirement information of the hard disk interface may be information about matching of hard disks in the server to be identified and a configuration situation of a slot on a backboard.

Figure 2:
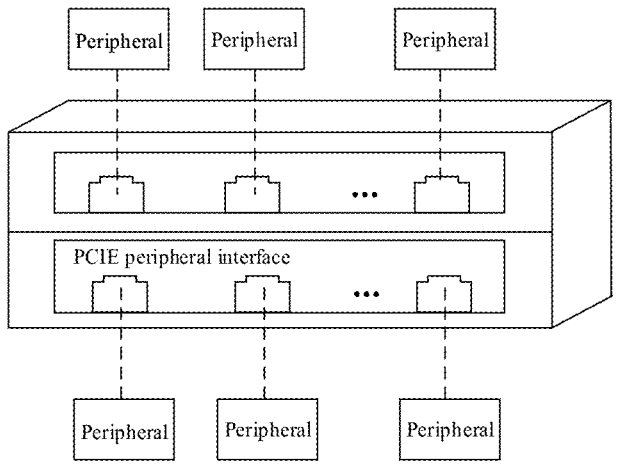
FIG. 2 is a schematic diagram of a physical structure of a server to be identified according to embodiments of the disclosure.

Illustratively, FIG. 2 is a schematic diagram of a physical structure of a server to be identified according to embodiments of the disclosure. As shown in FIG. 2, a distribution situation of slots in a physical apparatus of a server to be identified is shown. The server will be provided with PCIE external interfaces such that a connected data disk is mounted to a cloud service. Data is distributed to hard disks in blocks. After peripheral magnetic disk data of a data disk is damaged, the damaged data is recovered by using remaining data and corresponding parity check information.

Each PCIE external interface supports a different hard disk type. An accessible hard disk type may be limited for only a single PCIE external interface, or the PCIE external interface may support an anybay interface protocol such that a plurality of hard disk types can be provided for the interface. For instance, in a case of mixed insertion of hard disks, with an instance in which design requirement information of each hard disk interface indicates slot matching that a 16-disk server supports 8 serial advanced technology attachment (sata) slots+8 anybay slots, for full configuration of hard disks, a hard disk matching situation of a connected peripheral can be deduced from 9 combinations from 8 serial attached SCSI (SAS)/SATA+8 non-transitory memory express (NVME) to 16 SAS/SATA+0 NVME.

In an embodiment, in step 101, the apparatus for identifying peripheral configuration of server determines a process element (PE) port (the PCIE external interface) of each CPU according to configuration requirement information corresponding to actual design requirements of the server to be identified.

Illustratively, with an Intel Xeon series CPU as an instance, the interface is generally referred to as a PE port in an Intel system, and the PE port refers to the PCIE external interface hereinafter. Each CPU has 5 PE ports, and each PE port can support x16 PCIE lane, which can be flexibly allocated to different bandwidths. A common dual-socket server has 2*5=10 PE ports. A peripheral bandwidth is allocated to each PE port according to a level corresponding to an identity (ID) [1:0] signal of the port.

Step 102: A peripheral type that is capable of being configured for a peripheral bandwidth corresponding to the peripheral ID signal is determined in sequence according to a level state of each peripheral ID signal transmitted by each PCIE external interface. Corresponding serial numbers are allocated to peripherals of different peripheral types. A peripheral silkscreen including all peripheral sequences managed by the server to be identified is generated.

It should be noted that before step 102, the apparatus for identifying peripheral configuration of server formulates a mapping rule for the peripheral ID signal in advance. The mapping rule reflects a peripheral bandwidth and a peripheral type allocated to a peripheral of a peripheral type, and a corresponding relation between the peripheral bandwidth and the level state of the peripheral ID signal.

In an embodiment, in step 102, the apparatus for identifying peripheral configuration of server determines a peripheral bandwidth allocated by a current CPU PE port to all peripherals managed by the interface in sequence according to a level state of each peripheral ID signal transmitted for each PE port, determines a peripheral type that is capable of being configured for a corresponding peripheral bandwidth in combination with a predetermined mapping relation, allocates corresponding peripheral silkscreen to different peripheral types, and integrates the peripheral type, peripheral bandwidth, and peripheral silkscreen identified by the peripheral ID signal for each PE port into peripheral configuration information corresponding to the PE port.

The peripheral ID signal transmitted for each PE port is determined by a system shipping configuration of the server to be identified.

An output form of the peripheral configuration information of each PCIE external interface is not limited in an embodiment of the disclosure.

Illustratively, in an embodiment of the disclosure, with an instance in which the server to be identified is a single-socket server, and 4 PE ports exist, the PE ports are sorted from 0, and corresponding peripheral configuration information may be as shown in Table 1.

TABLE 1

First schematic table of peripheral configuration information

| PCIE external interface | Peripheral ID signal | Peripheral bandwidth | Peripheral type | Peripheral silkscreen |
|---|---|---|---|---|
| CPU0_PE0 | ID[1:0] = 00 | x4 | nvme | Nvme x |
|  | ID[1:0] = 01 | x8 | x8 riser | Slot x/x |
| CPU0_PE1 | ID[1:0] = 01 | x8 | x8 riser | Slot x/x |
|  | ID[1:0] = 10 | x16 | x16 riser | Slot x |
|  | ID[1:0] = 11 | Unconnected | Unconnected |  |
| CPU0_PE2 | ID[1:0] = 00 | x4 | nvme | Nvme x |
|  | ID[1:0] = 10 | x16 | x16 riser | Slot x |
| CPU0_PE3 | ID[1:0] = 01 | x8 | x8 riser | Slot x/x |
|  | ID[1:0] = 10 | x16 | x16 riser | Slot x |
|  | ID[1:0] =11 | Unconnected | Unconnected | — |

All peripheral ID signals included in a row of any PE port in Table 1 refer to bandwidths that the PE ports can support for access. In principle, each PE port supports access of a bandwidth of x16 or below. Finally, according to an actual shipping configuration of the device, a corresponding level value is endowed to the peripheral ID signal of the PE port to uniquely represent a bandwidth allocated thereto.

It can be understood that a peripheral card is identified in a late stage of BIOS startup. In an early stage, as long as a bandwidth to be allocated to the PE port of the CPU, and a relevant silkscreen are identified.

Step 103: The peripheral silkscreen is sent to a basic input output system and/or a baseboard management controller, and the basic input output system and/or the baseboard management controller are allowed to unify respective default silkscreen into the peripheral silkscreen.

In an embodiment, in step 103, the apparatus for identifying peripheral configuration of server transmits a peripheral silkscreen configured for a peripheral to the BIOS, the BIOS is allowed to unify all BIOS silkscreen to be displayed of a SETUP interface into a peripheral silkscreen.

Moreover, the apparatus for identifying peripheral configuration of server may transmit the peripheral configuration information to the BMC, such that the BMC unifies all BMC silkscreen displayed in a device list of a WEB interface into a peripheral silkscreen in the peripheral configuration information, to print location information of a device on the WEB interface for software and hardware corresponding.

In the related art, a peripheral configuration is identified generally through a method as follows: firstly, an ID [1:0] signal is required to be set in an Amphenol mini cool edge IO (MCIO) connector on a mainboard from which a PCIE cable is led out. All signals are pulled down on the mainboard. Pull-up and pull-down are adjusted on the hard disk backboard or a PCIE riser backboard according to a bandwidth of a PCIE peripheral. If an ID [1:0] level on an MCIO connector is 00, it is represented that a current PCIE peripheral has a x4 bandwidth (a nvme hard disk). Moreover, 01 represents a x8 bandwidth (riser card), 10 represents a x16 bandwidth (riser card), and 11 represents no connection.

With an Intel Xeon series CPU as an instance, each CPU has 5 PE ports, and each PE port can support x16 PCIE lane, which can be flexibly allocated to different bandwidths. A common dual-socket server has 2*5=10 PE ports. Different peripheral bandwidths are allocated to the PE ports according to levels corresponding to ID [1:0] signals of the ports. Thus, in a case of a configuration, a total of 10 sets of peripheral ID signals will be generated.

These 10 sets of peripheral ID signals are combined to form an identification code for a current configuration. Each configuration has its own unique identification code. The BIOS determines the current configuration according to the identification code formed by the combination of 10 sets of peripheral ID signals. After the current configuration is determined, PCIE bandwidth allocation is performed, and a silkscreen (such as nvme 0, 1, 2, 3 . . . ) of a peripheral connected to each CPU PE port in the BIOS is allocated. An implementation situation is shown in Table 2.

TABLE 2

Second schematic table of peripheral configuration information

| CPU_PE port | 16 disks (with an instance of full insertion of 16 nvme hard disks) | 16 disks (with an instance of reduced configuration of 12 nvme hard disks) |
| --- | --- | --- |
| CPU0_PE0 | ID[1:0] = 00 | ID[1:0] = 11 |
| CPU0_PE1 | ID[1:0] = 10 | ID[1:0] = 10 |
| CPU0_PE2 | ID[1:0] = 00 | ID[1:0] = 00 |
| CPU0_PE3 | ID[1:0] = 11 | ID[1:0] = 11 |
| CPU0_PE4 | ID[1:0] = 11 | ID[1:0] = 11 |
| CPU1_PE0 | ID[1:0] = 00 | ID[1:0] = 00 |
| CPU1_PE1 | ID[1:0] = 01 | ID[1:0] = 01 |
| CPU1_PE2 | ID[1:0] = 00 | ID[1:0] = 00 |
| CPU1_PE3 | ID[1:0] = 10 | ID[1:0] = 10 |
| CPU1_PE4 | ID[1:0] = 10 | ID[1:0] = 10 |
| Current configuration identification code | 00 10 00 11 11 00 01 00 10 10 | 11 10 00 11 11 00 01 00 10 10 |

According to a method for accurately corresponding to a current configuration according to an ID combination in an existing solution, the method for identifying configuration is not suitable for a case that a user requires flexible configurations. When mixed insertion of hard disks exits in a user scenario, with an instance in which a 16-disk model supports 8 sata slots+8 anybay slots, 9 combinations exit only in a case of full configuration of hard disks. With a 16-disk all-anybay configuration as an instance, 17 situations exit only in a case of full configuration of hard disks. In a case of configuration reduction and mixed matching of hard disks, each possible sata and nvme hard disk number matching situation is required to be accurately identified.

According to a current detailed identification solution, to satisfy mixed matching and configuration reduction of hard disks, a matrix having different matching generated according to a hard disk type and number is required to be sorted out for each model. An overall design is required to cover all possible configurations for detailed sorting. Numbers of every types of hard disks are listed. A unique identification code composed of 10 sets of peripheral ID signals is required to be generated for each case such that the BIOS can accurately display a silkscreen of the current configuration. Configurations after splitting will generate hundreds of identification combinations, which is difficult to achieve in theory and is also impossible to achieve in reality because of cost.

According to the design solution, the identification code formed by combining 10 groups of peripheral ID signals is discarded, and the method for determining each configuration is refined. According to this design, starting with PE ports of the CPUs, all configurations of a current server product is listed, and the PE port of each CPU is required to support all situations of a peripheral. According to the ID [1:0] value of the PE port of each CPU, the system determines and directly allocates all bandwidths, peripherals and silkscreen to which each PE port may correspond. The identification code formed by 10 groups of peripheral ID signals of each configuration is not distinguished, and no silkscreen is allocated to each peripheral by searching a configuration splitting table pre-listed by using an identification code, but peripheral silkscreen are fixedly allocated.

According to an embodiment of the disclosure, a distribution situation of PCIE external interfaces for central processing units is determined on the basis of configuration requirement information of the server. Through peripheral configuration information represented by a peripheral ID signal of each PCIE external interface in all the configurations, provider edge (PE) ports of each CPU are uniformly allocated to a same BIOS setup silkscreen and baseboard management controller (BMC) web silkscreen. Software silkscreen of a server having an anybay hard disk interface can be uniformly processed in cases of different models and configurations such that a situation that a software configuration is too complicated can be avoided. Even in the face of flexible requirements such as mixed insertion and configuration reduction of hard disks, the disclosure can be fully adapted, and efficiency and feasibility of peripheral configuration identification can be improved.

On the basis of any one of the above embodiments, the steps that a peripheral type that is capable of being configured for a peripheral bandwidth corresponding to the peripheral ID signal is determined in sequence according to a level state of each peripheral ID signal transmitted by each PCIE external interface, corresponding serial numbers are allocated to peripherals of different peripheral types, and a peripheral silkscreen including all peripheral sequences managed by the server to be identified is generated include: design requirement information of each hard disk interface in all servers to be identified is traversed, and a slot number and location of an anybay hard disk interface in each server to be identified, and a slot silkscreen of each server to be identified in the basic input output system are obtained.

In an embodiment, in step 102, a new general rule may be established on a silkscreen allocation policy corresponding to the apparatus for identifying peripheral configuration of server. Thus, firstly, in response to a user operation, integration and sorting are performed in combination with design requirement information of all servers to be identified for hard disk interfaces. A slot number and location supporting anybay hard disk interfaces in each server to be identified are determined. A default slot silkscreen of a corresponding server to be identified in the BOIS system is obtained.

According to all peripheral ID signals transmitted in each server to be identified and through a corresponding relation between the peripheral ID signals and peripheral bandwidths, a peripheral type supported by each server to be identified is determined.

In an embodiment, the apparatus for identifying peripheral configuration of server determines peripheral bandwidths allocated by a current CPU PE port to all peripherals managed by the CPU PE port according to the level states of peripheral ID signals transmitted by interfaces of the currently identified server, and determines peripheral types that is capable of being supported by each server to be identified in combination with a corresponding relation between peripheral ID signals and peripheral bandwidths.

Slot numbers of peripherals having peripheral types of non-transitory memory express (nvme) of all the servers to be identified are configured from a target PCIE external interface of a target central processing unit. Configuring implementation steps are as follows:

a PCIE external interface set having N PCIE external interfaces is configured in sequence from the target PCIE external interface on the basis of slot numbers and locations of anybay hard disk interfaces in the servers to be identified.

Slot numbers of peripherals having peripheral types of nvme for each PCIE external interface in the PCIE external interface set are allocated as 0 to M in sequence, corresponding silkscreen templates are filled with the allocated slot numbers in sequence, and peripheral silkscreen of the peripherals having the peripheral types of nvme are generated.

In an embodiment, M is a positive integer, and M represents a number of nvme hard disks supported by a configuration that supports most nvme hard disks after configurations of all the servers to be identified are traversed. Moreover, N is a positive integer, and N represents a number of PCIE external interfaces of the central processing unit used by a configuration that supports most nvme hard disks after configurations of all servers are traversed. A corresponding relation between N and M is determined according to a number of buses of PCIE supported by each PCIE external interface of the central processing unit, and a value of N is deduced after a value of M is determined. A PCIE external interface set configured by a server to be identified and having fewer peripherals having peripheral types of nvme is a subset of a PCIE external interface set configured by a server to be identified and having more peripherals having peripheral types of nvme.

In an embodiment, a CPU PE port is used as a hard disk backboard corresponding to a peripheral type in different models. However, due to the difference in models, the BIOS allocates different peripheral silkscreen to the CPU PE port.

With an instance in which the peripheral type is a nvme hard disk backboard, for a 16-disk model supporting all anybay, a starting location of a case silkscreen corresponding to nvme is slot 0. Thus, silkscreen allocated to the PE port corresponding to 4 nvme hard disks in the BIOOS are 0, 1, 2, and 3.

In a case that only last two slots of a 12-disk model supports anybay, a starting location of nvme corresponding to a case silkscreen is slot 10, and silkscreen allocated to the corresponding PE ports in the BIOS are 10 and 11.

In a case that last two slots of a 9-disk model support anybay, a starting location of a nvme case silkscreen is slot 7, and silkscreen allocated to the corresponding PE port in the BIOS are 7 and 8. Thus, if a CPU PE port is required to be allocated as an nvme hard disk in cases of different model configurations, the method for allocating PCIE bandwidths and silkscreen purely according to the peripheral ID signal value is required to be further adjusted.

In view of this situation, the technical solution of the embodiment of the disclosure should be considered accordingly during design. With 9-disk, 12-disk and 16-disk models with NVME hard disk requirements as an instance, PCIE outlets of the nvme backboard involved in each model are all from a fixed PE port of a fixed CPU (that is, the target central processing unit), and in all configurations, nvme allocation starts from the same target PCIE external interface:

Firstly, according to a slot number and location of anybay hard disk interfaces supported by servers to be identified of different models, and the number of nvme disks explicitly supported by the servers to be identified, whether the PE ports can fully accommodate the bandwidths required by the nvme peripherals is in sequence determined starting from the PE ports arranged in the highest order in the currently identified servers. If yes, the PE port is taken as a Japanese standard PCIE external interface, such that PCIE outgoing lines of the nvme peripherals in each model are led out from the same PE port until N PE ports which also satisfy the conditions are selected in sequence from front to back, and integrated into a PCIE external interface set.

If no, the PE port is postponed to the next PE port for similar determination until a first target PCIE external interface satisfying bandwidth allocation is found.

Then, the slot numbers of the nvme peripherals managed by the PCIE external interfaces included in the PCIE external interface set are sorted in sequence from 0 with equal difference intervals of 1, and are increased at most to M corresponding to a number of nvme hard disks supported by a server supporting most nvme hard disks of all the servers to be identified. Then, according to the silkscreen rules corresponding to the nvme peripherals, corresponding silkscreen templates are filled with corresponding slot number combinations in sequence, and finally a peripheral silkscreen of a nvme peripheral in a currently identified server is obtained.

Since granularity of nvme hard disk identification in 4 pieces as a unit, in a case that the nvme backboard is in place, and hard disks are not fully inserted into the backboard, and the silkscreen will show all silkscreen of the backboard (in 4 hard disks as a unit). An actual hard disk presence situation can be determined through a next level menu.

It can be understood that since numbers of nvme disks supported by different models are different, it is required to ensure that a PCIE external interface set configured by a server having fewer nvme hard disks is a subset of a PCIE external interface set configured by a server having most nvme hard disks.

In a case that each of the 9-disk model and the 12-disk model requires 2 pieces of nvme, support is performed from CPU0_PE0. In a case that a 16-disk model requires 16 pieces of nvme, nvme disks are required to be evenly distributed to PE ports of two CPUs, that is, support is performed from CPU0_PE0, CPU0_PE2, CPU1_PE0, and CPU1_PE2. A nvme silkscreen in peripheral configuration information in a case of 16-disk model full configuration is shown in Table 3.

TABLE 3

Third schematic table of peripheral configuration information

| PCIE external interface | Peripheral ID signal | Peripheral bandwidth | Peripheral type | Peripheral silkscreen |
|---|---|---|---|---|
| CPU0_PE0 | ID[1:0] = 00 | ×4 | nvme | nvme 0, 1, 2, 3 |
|  | ID[1:0] = 01 | ×8 | ×8 riser | ... |
| CPU0_PE1 | ID[1:0] = 01 | ×8 | ×8 riser | ... |
|  | ID[1:0] = 10 | ×16 | ×16 riser | ... |
|  | ID[1:0] = 11 | Default x16 (unconnected) | Unconnected | — |
| CPU0_PE2 | ID[1:0] = 00 | ×4 | nvme | nvme 4, 5, 6, 7 |
|  | ID[1:0] = 10 | ×16 | ×16 riser | ... |
| CPU0_PE3 | ID[1:0] = 01 | ×8 | ×8 riser | ... |
|  | ID[1:0] = 10 | ×16 | ×16 riser | ... |
|  | ID[1:0] = 11 | Default x16 (unconnected) | Unconnected | — |
| ... | ... | ... | ... | ... |
| ... | ... | ... | ... | ... |
| ... | ... | ... | ... | ... |

In an embodiment, nvme 8, 9, 10, and 11 are allocated in CPU1_PE0, nvme12, 13, 14, and 15 are allocated in CPU1_PE2, which will not be repeated in Table 3.

In addition, since each model supports a different anybay backboard slot, a number of nvme hard disks required for each configuration is different, and a slot location on a case is also different. For instance, a 16-disk model is required to support nvme from slots 0-15 of a case slot (that is, a case silkscreen). A 12-disk configuration is only required to support nvme from case slots 10 and 11, and a 9-disk configuration is only required to support nvme from case slots 7 and 8.

The silkscreen templates correspond to the peripheral types one by one, and the silkscreen templates are composed of combinations of silkscreen types corresponding to the peripheral types and the slot numbers.

It can be understood that in a case of mixed insertion of hard disks, one or more case slots are required to be instructed to support target peripherals of different peripheral types according to the configuration requirement information. Peripheral silkscreen of different peripheral types are prevented from being misplaced by performing silkscreen allocation from 0 to target peripherals of different peripheral types.

According to an embodiment of the disclosure, target PCIE external interfaces satisfying actual design requirements are screened out in sequence from a port sequence. A decision is made according to the total number of the target PCIE external interfaces and the total number of the PCIE external interfaces. After the slot numbers of the target peripherals are sorted from 0 in cases of full configuration and reduced configuration, target silkscreen templates corresponding to the peripheral types of the target peripherals are filled with the sorted slot numbers such that peripheral silkscreen corresponding to the target peripherals in cases of the target PCIE external interfaces are generated. The peripheral silkscreen can be uniformly sorted when different models face the requirements of mixed insertion and configuration reduction of hard disks. Inaccurate configuration identification caused by large differences in peripheral silkscreen of different peripheral types can be avoided.

On the basis of any one of the above embodiments, the step that the target PCIE external interface is screened out from the port sequence on the basis of the design requirement information of each hard disk interface includes: the target PCIE external interfaces are distributed in the central processing units evenly in a case that the target peripheral type is determined as an nvme hard disk.

In an embodiment, when determining that the target peripheral type is an nvme hard disk, the apparatus for identifying peripheral configuration of server is required to evenly allocate the target PCIE external interfaces adapted to the nvme hard disks to PE ports of all CPUs included in the server to be identified.

In an embodiment of the disclosure, it is decided to distribute the target PCIE external interfaces in the central processing units evenly in a case that the target peripheral type is determined as an nvme hard disk. A load balance of a plurality of CPUs can be satisfied. Moreover, no matter how the number of hard disks changes, the nvme silkscreen of each configuration can be kept uniform in the BIOS.

On the basis of any one of the above embodiments, after the peripheral bandwidth of each peripheral of the PCIE external interface is determined on the basis of the peripheral ID signal, the method further includes: in a case that it is determined two peripherals having a same peripheral bandwidth but different peripheral silkscreen exit at the currently identified PCIE external interface, the peripheral configuration is identified according to peripheral ID signals transmitted by remaining PCIE external interfaces, and a peripheral silkscreen is allocated to the currently identified PCIE external interface.

In an embodiment, in a case that in a CPU PE port, the apparatus for identifying peripheral configuration of server determines according to the peripheral ID signal transmitted by the CPU PE port that different peripheral silkscreen are allocated to the same ID level value (that is, the same PCIE bandwidth), it is required to identify features of the interface configuration different from other interface configurations according to allocation of peripheral ID signals of other CPU PE ports, and further allocate corresponding peripheral silkscreen to the currently identified CPU PE port according to different features of a peripheral in cases of a plurality of CPU PE ports.

In an embodiment of the disclosure, in a case that it is determined that different silkscreen are allocated to the same peripheral ID signal in the same CPU PE port, it is decided to identify peripheral configurations of the peripheral ID signals transmitted by remaining PCIE external interfaces first. After unique features of the port configuration relative to other port configurations can be compared, the peripheral silkscreen of the current CPU PE port are configured by using the features. Moreover, the situation that in the CPU PE port, repeated peripheral silkscreen are allocated to two peripherals having a same peripheral bandwidth can be avoided.

On the basis of any one of the above embodiments, the peripheral bandwidths are divided according to the peripheral types.

The peripheral types include an nvme hard disk corresponding to a peripheral bandwidth of x4, a riser hard disk corresponding to a peripheral bandwidth of x8, a riser hard disk or an open compute project (OCP) hard disk corresponding to a peripheral bandwidth of x16, and a null value.

In an embodiment, before step 102, the apparatus for identifying peripheral configuration of server classifies, according to PCIE peripheral expandable types, the peripheral types into a nvme hard disk having a peripheral bandwidth of x4, a riser hard disk having a peripheral bandwidth of x8, a riser hard disk or an OCP hard disk having a peripheral bandwidth of x16 s, and a null value corresponding to a case that no peripheral is connected. Signal values 00, 01, 10 and 11 of the ID [1:0] signals are respectively used to correspond to the above four bandwidth allocation situations in sequence.

Two peripheral types correspond to the peripheral bandwidth of x16. In addition to an ID value, identification of the OCP hard disk is required to depend on an OCP bit signal.

According to an embodiment of the disclosure, peripheral bandwidths are divided into four types according to expandable peripheral types, such that peripheral types and peripheral bandwidths supported by each interface can be uniquely determined according to peripheral ID signals when a configuration is identified, and corresponding silkscreen are allocated. The peripheral silkscreen corresponding to each peripheral type can be unified to start from 0. Thus, deviations between silkscreen in the BIOS and silkscreen of a hardware case in cases of different configurations caused by one fixed slot silkscreen number from 0 to x of an original case silkscreen can be avoided.

On the basis of any one of the above embodiments, the peripheral silkscreen are determined according to the peripheral types.

The peripheral silkscreen include an nvme silkscreen corresponding to peripheral type nvme, and PCIE slot silkscreen corresponding to peripheral types other than the nvme.

In an embodiment, before step 102, the apparatus for identifying peripheral configuration of server classifies, according to the PCIE peripheral expandable types, the corresponding peripheral silkscreen into nvme silkscreen corresponding to nvme and PCIE slot silkscreen corresponding to peripheral types other than nvme.

Correspondingly, as shown in Table 1 and Table 2, if the peripheral bandwidth of the target peripheral is x4, a corresponding silkscreen type is nvme, and a silkscreen template corresponding to the nvme silkscreen is nvme x1.

In an embodiment, x1 is the slot number combination corresponding to the nvme silkscreen.

Illustratively, as shown in Table 1 and Table 3, if the peripheral bandwidth of the target peripheral is a value other than x4, the corresponding silkscreen type is a peripheral type other than nvme, and a silkscreen template corresponding to the PCIE slot silkscreen is slot x2.

In an embodiment, x2 is a slot number combination corresponding to the PCIE slot silkscreen.

In a case that an x16 bandwidth is allocated to the PE port, the PE port supports only one x16 slot, and a PCIE slot silkscreen is slot x2. In a case that 2 x8 bandwidths are allocated to the PE port, the PE port supports two x8 slots, and a PCIE slot silkscreen is slot x3/x4.

According to an embodiment of the disclosure, peripheral silkscreen are divided into four types according to expandable peripheral types, such that peripheral types and peripheral bandwidths supported by each interface can be uniquely determined according to peripheral ID signals when a configuration is identified, and corresponding silkscreen are uniquely allocated. The peripheral silkscreen corresponding to each peripheral type can be unified to start from 0. Thus, deviations between silkscreen in the BIOS and silkscreen of a hardware case in cases of different configurations caused by one fixed slot silkscreen number from 0 to x of an original case silkscreen can be avoided.

Figure 3:
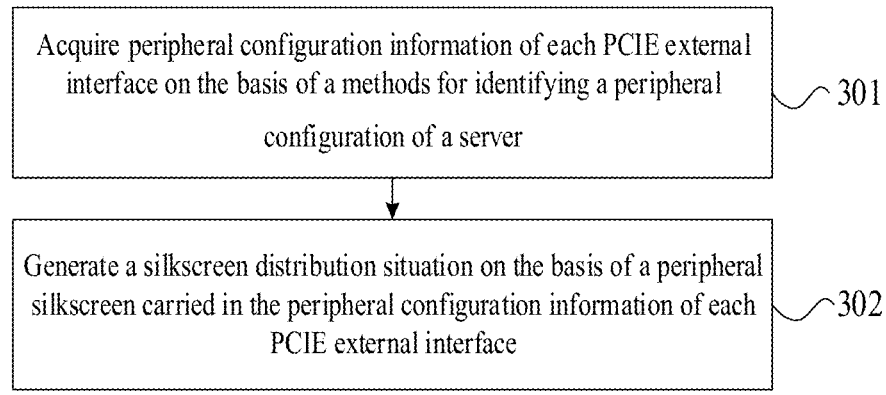
FIG. 3 is a schematic flow diagram of a method for laying out peripheral silkscreen according to embodiments of the disclosure.

FIG. 3 is a schematic flow diagram of a method for laying out peripheral silkscreen according to embodiments of the disclosure. As shown in FIG. 3, on the basis of any one of the above embodiments, the method for laying out peripheral silkscreen provided in an embodiment of the disclosure includes: step 301: peripheral configuration information of each PCIE external interface is acquired on the basis of the above method for identifying peripheral configuration of server.

It should be noted that an execution body of the method for laying out peripheral silkscreen provided in an embodiment of the disclosure is an apparatus for laying out peripheral silkscreen arranged in a server.

An application scenario of the method for laying out peripheral silkscreen provided in an embodiment of the disclosure is as follows: after the apparatus for identifying peripheral configuration of server identifies the configuration of a processor to be identified, a physical silkscreen is laid out.

In an embodiment, in step 301, the apparatus for laying out peripheral silkscreen obtains identified peripheral configuration information of each PCIE external interface when the apparatus for identifying peripheral configuration of server executes the method for identifying peripheral configuration of server for a service to be identified.

Step 302: A silkscreen distribution situation is generated on the basis of a peripheral silkscreen carried in the peripheral configuration information of each PCIE external interface.

In an embodiment, in step 302, the apparatus for laying out peripheral silkscreen extracts all peripheral silkscreen from the peripheral configuration information of each PCIE external interface, lays out the peripheral silkscreen, and generates the silkscreen distribution situation.

The silkscreen distribution situation includes independent arrangement formed by arranging peripheral silkscreen of the same silkscreen type according to the slot number included therein.

According to an embodiment of the disclosure, according to the peripheral configuration information of each PCIE external interface identified on the basis of the apparatus for identifying peripheral configuration of server, the peripheral silkscreen of different silkscreen types in the peripheral configuration information are arranged independently in parallel. The peripheral silkscreen can perfectly correspond to BIOS silkscreen and hard disk location numbers in a device list of BMC WEB.

On the basis of any one of the above embodiments, the step that a silkscreen distribution situation is generated on the basis of a peripheral silkscreen carried in the peripheral configuration information of each PCIE external interface includes: first arrangement and distribution and second arrangement and distribution are generated in a horizontal direction on the basis of configuration requirement information of a server to be identified and an nvme silkscreen included in the peripheral silkscreen respectively.

In an embodiment, in step 302, the apparatus for laying out peripheral silkscreen divides the physical silkscreen on the case into a SATA physical silkscreen row and an NVME physical silkscreen row, and the physical silkscreen rows are independent and parallel. Moreover, according to slots, which support anybay hard disk interfaces, in the hard disk interface matching indicated by the configuration requirement information, the arrangement of SAS (a hard disk based on an SCSI (small computer system interface) protocol)/SATA hard disk interfaces is converted. Sorting is performed from 0. A horizontal row where the SATA physical silkscreen is located is filled in sequence to form first arrangement and distribution. The horizontal row where the NVME physical silkscreen is located is filled with a nvme silkscreen in a peripheral silkscreen on a software level to form second arrangement and distribution.

In an embodiment, SATA physical silkscreen and NVME physical silkscreen included in the physical silkscreen on the case face plate are as follows:

(1) The SATA physical silkscreen start from a leftmost side of the case face plate, and a total number of sata disks required to be supported is different according to the differences of models. For instance, 16-disk configuration sata silkscreen are divided into 0-15 to support 16 sata hard disks; 9-disk configuration sata silkscreen are divided into 0-8 to support 9 sata hard disks; and 12-disk configuration sata silkscreen are divided into 0-11 to support 12 sata hard disks.

(2) Due to different models, the NVME physical silkscreen support different numbers of NVME disks, and different slot locations of anybay on a case. Thus, an initial layout unit location (that is, a location where NVME0 starts) of an NVME silkscreen on the case is required to be aligned with a corresponding SAS/SATA silkscreen.

The first arrangement and distribution and the second arrangement and distribution are spliced vertically, and the silkscreen distribution situation is generated.

In an embodiment, the apparatus for laying out peripheral silkscreen splices the first arrangement and distribution and the second arrangement and distribution vertically in parallel, right-aligns the first arrangement and distribution and the second arrangement and distribution, and obtains the silkscreen distribution situation.

According to an embodiment of the disclosure, the hard disk slot location distribution is determined according to the server configuration, and the first arrangement and distribution is generated through direct sorting. Then, physical silkscreen locations arranged horizontally in advance are directly filled with nvme silkscreen included in the peripheral silkscreen, and the second arrangement and distribution is obtained. The formed first arrangement and distribution and the second arrangement and distribution are spliced vertically, and the silkscreen distribution situation is obtained. The case silkscreen can be divided into a SATA silkscreen row and an NVME row, and the silkscreen rows are independent and parallel. A physical silkscreen on the case is adapted to each model separately, such that silkscreen distribution on the software level is consistent with physical silkscreen distribution on the case face plate in cases of different models and configurations.

On the basis of any one of the above embodiments, the step that first arrangement and distribution and second arrangement and distribution are generated in a horizontal direction on the basis of configuration requirement information of a server to be identified and an nvme silkscreen included in the peripheral silkscreen respectively includes: a first distribution range and a second distribution range are determined on the basis of the configuration requirement information.

The number of layout units included in the first distribution range is determined according to the total number of case slots included in the configuration requirement information. The initial layout unit of the second distribution range is vertically aligned with the target layout unit in the first distribution range. The target layout unit is determined according to the case slot corresponding to the first anybay hard disk interface in the server to be identified.

In an embodiment, the apparatus for laying out peripheral silkscreen correspondingly creates a corresponding number of continuous layout units in the horizontal direction of the canvas according to the number of case slots carried in the configuration requirement information of the server to be identified and a hard disk type supported by each case slot. A first distribution range is formed, and each layout unit in the first distribution range is used to indicate whether the corresponding case slot supports sas/sata hard disks.

Moreover, a target layout unit in the first distribution range is determined according to an order of the case slot in which the first anybay hard disk interface is located in the configuration requirement information. A corresponding number of continuous layout units right below the target layout unit are started to be created. The second distribution range is formed. Each layout unit in the second distribution range is used to indicate whether a corresponding case slot supports an nvme hard disk.

In a case that corresponding silkscreen are allocated to two layout units in a row, it is indicated that the corresponding case slot in the row supports an anybay hard disk interface. In a case that a silkscreen is allocated to only one layout unit in a column, it is indicated that the corresponding case slot in this column only supports a single hard disk interface corresponding to this silkscreen type.

Filling is carried out from 0 in sequence from left to right in the first distribution range, and the first arrangement and distribution is generated.

In an embodiment, the apparatus for laying out peripheral silkscreen may fill layout units in the first distribution range in sequence from left to right directly from 0 according to SAS/SATA hard disk slot distribution determined according to the distribution of anybay hard disk interfaces on the backboard indicated by the configuration requirements, to form the first arrangement and distribution.

Since anybay hard disk interfaces support sata hard disks and nvme hard disks, SAS/SATA hard disk slot distribution can be deduced by using anybay hard disk interface distribution and non-anybay hard disk interface distribution. Especially in a case of full configuration, the number of SAS/SATA hard disk slots is equal to the total number of case slots.

The corresponding second distribution range is filled with slot numbers in the nvme silkscreen in sequence from left to right, and the second arrangement and distribution is generated.

In an embodiment, the apparatus for laying out peripheral silkscreen fills the layout units in the second distribution range with the slot numbers carried in sequence from left to right in the nvme silkscreen on the software level, to form the second arrangement and distribution.

Figure 4:
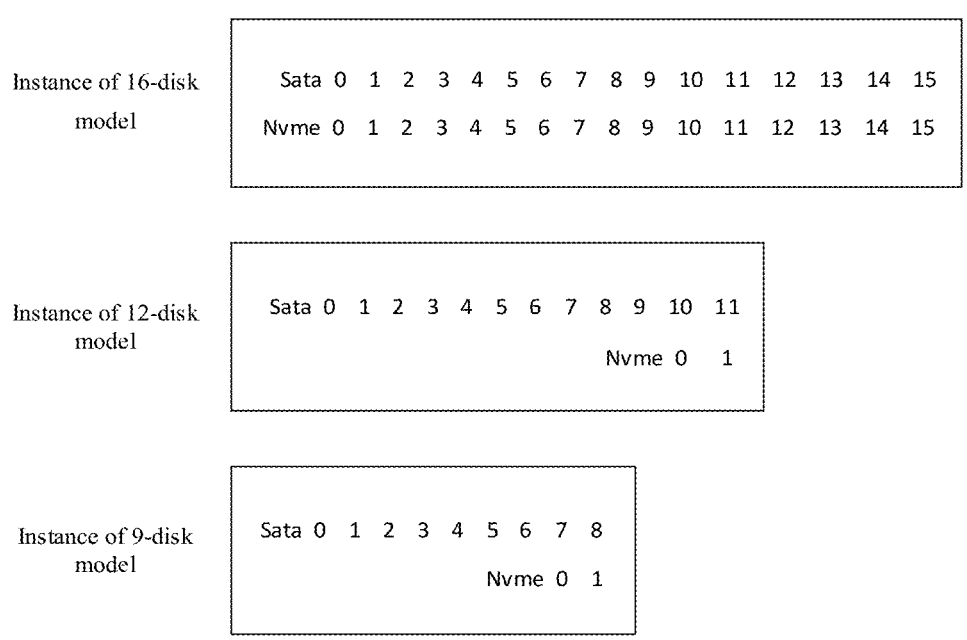
FIG. 4 is a schematic diagram of an arrangement of physical silkscreen according to embodiments of the disclosure.

Illustratively, FIG. 4 is a schematic diagram of an arrangement of physical silkscreen according to some embodiments of the disclosure. As shown in FIG. 4, according to the embodiments of the disclosure, with servers configured with 16 disks, 12 disks and 9 disks as instances, an arrangement and distribution mode corresponding to the silkscreen distribution situation is provided.

For instance, in the form of a 16-disk all-anybay backboard, 16 pieces of nvme are required to be supported, a first distribution range including 16 horizontally arranged layout units is generated from the leftmost side of the canvas, and first arrangement and distribution formed about 0-15 is obtained according to the SAS/SATA hard disk slot distribution. Similarly, the number of units included in the second distribution range is the same as that in the second distribution range. After filling is performed with the nvme silkscreen in the peripheral silkscreen in sequence, the obtained second arrangement and distribution is the same as the first arrangement and distribution.

For instance, 12 disks support a mode of 10 sata interfaces+2 anybay interfaces. Thus, it is required to support 12 sata interfaces at most and 2 nvme interfaces. Since the anybay interface (that is, the interface that is required to support nvme) is located at a 10th/11th interface of the backboard, which is located at the rear of the case, the second arrangement and distribution is divided into 0-1, and a nvme 0 silkscreen is required to be aligned with a sata 10 silkscreen in location on the case face plate.

For another instance, 9 disks support 7 sata interfaces+2 anybay interfaces. Thus, it is required to support 9 sata interfaces at most and 2 nvme interfaces. Since the anybay interface (that is, the interface that is required to support nvme) is located at a 7th/8th interface of the backboard, which is located at the rear of the case, the second arrangement and distribution is divided into 0-1, and a nvme 0 silkscreen is required to be aligned with a sata 7 silkscreen in location on the case face plate.

According to an embodiment of the disclosure, when the first distribution range is determine according to the configuration requirement information, a target layout unit where a case slot corresponds to a first anybay hard disk interface is located in the first distribution range is used as an initial layout unit of a second distribution range to create a space. The first distribution range and the second distribution range are filled with nvme silkscreen included in SAS/SATA hard disk slot distribution and peripheral silkscreen, to form first arrangement and distribution and second arrangement and distribution respectively. The disclosure can be adapted to any configuration reduction, mixed matching, and flexible insertion of any model, and can ensure that a BIOS software silkscreen is the same as the physical silkscreen on the case face plate.

On the basis of any one of the above embodiments, after the step that a silkscreen distribution situation is generated on the basis of a peripheral silkscreen carried in the peripheral configuration information of each PCIE external interface, the method further includes: a silkscreen layout diagram is generated on the basis of the silkscreen distribution situation.

In an embodiment, after step 302, the apparatus for laying out peripheral silkscreen may further adjust the silkscreen distribution situation according to built-in graphic design software to generate a silkscreen layout diagram.

The silkscreen layout diagram is transmitted to a printing and outputting device, and the printing and outputting device is allowed to print and output the silkscreen layout diagram in a form of a label sticker.

The label sticker is used to be attached to a surface of a case ear plate of the server to be identified to indicate a peripheral configuration of the server to be identified.

In an embodiment, the apparatus for laying out peripheral silkscreen transmits the designed silkscreen layout diagram to the printing and outputting device.

The printing and outputting device receives the silkscreen layout diagram, controls the printing and outputting device to respond to a printing signal, and prints the silkscreen layout diagram into a label sticker.

Under a manual action of a user, the label sticker can be attached to the surface of the case ear plate of the server to be identified, to identify the relevant peripheral configuration of the corresponding server.

The existing forms of the label sticker include but are not limited to an adhesive sticker, a magnetic sticker, etc., which is not limited in an embodiment of the disclosure.

According to an embodiment of the disclosure, a silkscreen layout diagram is generated through adjustment according to the silkscreen distribution situation. Moreover, the silkscreen layout diagram is sent to a printing device, such that the silkscreen layout diagram is output in a physical form of a label sticker. Corresponding physical silkscreen can be output for the software silkscreen of servers of different models and configurations. The physical silkscreen is attached to a corresponding server in a form of a label sticker such that a current state in which each slot supports a hard disk can be accurately displayed. Moreover, corresponding is perfectly performed on BIOS silkscreen and hard disk location numbers in a device list of BMC WEB.

On the basis of any one of the above embodiments, the step that a silkscreen layout diagram is generated on the basis of the silkscreen distribution situation includes: different font colors are set for the first arrangement and distribution and the second arrangement and distribution in the silkscreen distribution situation.

In an embodiment, the apparatus for laying out peripheral silkscreen sets different font colors for the first arrangement and distribution and the second arrangement and distribution in the silkscreen distribution situation.

In a case that it is determined that the configuration requirement information indicates that all hardware interfaces in the server to be identified are anybay hard disk interfaces, longitudinal partitions corresponding, in number, to CPUs of the server to be identified are generated in the canvas.

In an embodiment, when determining according to the configuration requirement information that all hardware interfaces in the server to be identified support the anybay hard disk interfaces, the apparatus for laying out peripheral silkscreen generates longitudinal partitions corresponding, in number, to CPUs of the server to be identified in the canvas corresponding to the label sticker.

The corresponding first arrangement and distribution and second arrangement and distribution are filled with different font colors in each longitudinal partition, and the silkscreen layout diagram is generated.

In an embodiment, according to the CPU PE port where the peripheral silkscreen is located, the apparatus for laying out peripheral silkscreen fills a longitudinal partition corresponding to the CPU with a part corresponding to the PE port located on the same CPU in the first arrangement and distribution and the second arrangement and distribution in a font color of a setting number, to generate a final silkscreen layout diagram.

According to an embodiment of the disclosure, different font colors are set for the first arrangement and distribution and the second arrangement and distribution according to actual display requirements. When it is determined that all hardware interfaces in the server support anybay according to configuration requirement information, corresponding longitudinal partitions are filled with the first arrangement and distribution and the second arrangement and distribution with corresponding font colors, to obtain a final silkscreen layout diagram before printing. The supported hard disk slots can be displayed in different colors according to the anybay slot location requirements of different models, and are adapted to each model separately.

On the basis of any one of the above embodiments, after the step that different font colors are set for the first arrangement and distribution and the second arrangement and distribution in the silkscreen distribution situation, the method further includes: in a case that it is determined that the configuration requirement information indicates that at least one hardware interface in the server to be identified is not an anybay hard disk interface, independent partitions corresponding, in number, to layout units of the first arrangement and distribution are generated in the canvas.

In an embodiment, when determining according to the configuration requirement information that some hardware interfaces in the server to be identified support the anybay hard disk interface, the apparatus for laying out peripheral silkscreen generates independent partitions corresponding, in number, to layout units distributed in the first arrangement and distribution in the canvas corresponding to the label sticker.

All independent partitions may be arranged in the form of a plurality of rows and columns.

The independent partitions are filled with elements in the first arrangement and distribution in sequence after the font colors are set.

In an embodiment, the apparatus for laying out peripheral silkscreen fills a corresponding independent partition with each element in the first arrangement and distribution in the set font color.

The independent partitions from a target independent partition to a last independent partition are filled with elements in the second arrangement and distribution in sequence after the font colors are set, and the silkscreen layout diagram is generated.

The target independent partition is an independent partition corresponding to a target layout unit in the first arrangement and distribution.

It should be noted that the target independent partition is an independent partition corresponding to a target layout unit in the first arrangement and distribution.

In an embodiment, the apparatus for laying out peripheral silkscreen fills independent partitions from the target independent partition to the last independent partition in sequence with each element in the second arrangement and distribution with a font color different from that of the first arrangement and distribution, and arrange same after elements in the first arrangement and distribution of the corresponding independent partitions, to generate the final silkscreen layout diagram.

According to an embodiment of the disclosure, different font colors are set for the first arrangement and distribution and the second arrangement and distribution according to actual display requirements. When it is determined that only part of hardware interfaces in the server support anybay according to configuration requirement information, a same number of independent partitions are created according to the number of units of the first arrangement and distribution. After each independent partition is filled with the first arrangement and distribution in corresponding font colors, the target independent partition is started to be compatibly filled with the second arrangement and distribution in corresponding font colors, to obtain a final silkscreen layout diagram before printing. The supported hard disk slots can be displayed in different colors according to the anybay slot location requirements of different models, and are adapted to each model separately.

On the basis of any one of the above embodiments, after the step that a silkscreen layout diagram is generated on the basis of the silkscreen distribution situation, the method further includes: a label partition is established below the silkscreen layout diagram in a case that it is determined according to the configuration requirement information that the server to be identified is configured with only one hardware interface.

In an embodiment, a label partition is created right below the silkscreen layout diagram in a case that the apparatus for laying out peripheral silkscreen determines according to the configuration requirement information that the server to be identified is configured with only one hardware interface.

The width of the label partition is equal to the width of the silkscreen layout diagram, and the length of the label partition is less than the length of the silkscreen layout diagram.

Corresponding label content is set in the label partition according to a type of the configured hardware interface.

In an embodiment, the apparatus for laying out peripheral silkscreen sets label content corresponding to the type of the hardware interface configured only by the server to be identified in the label partition according to the type of the hardware interface, to generate the final silkscreen layout diagram.

Figure 5:
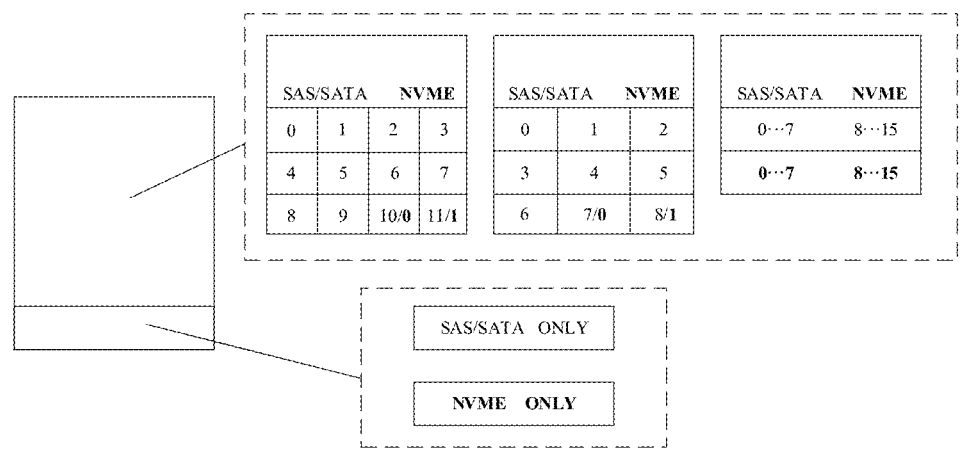
FIG. 5 is a schematic diagram of an arrangement of a silkscreen layout diagram according to embodiments of the disclosure.

Illustratively, FIG. 5 is a schematic diagram of an arrangement of a silkscreen layout diagram according to some embodiments of the disclosure. As shown in FIG. 5, according to the embodiments of the disclosure, with servers configured with 16 disks, 12 disks and 9 disks as instances, an arrangement and distribution mode corresponding to the silkscreen layout diagram is provided.

It should be understood that the bold part in FIG. 5 illustrates only a case that is distinguished from nvme silk silkscreen and sata silk silkscreen. In addition to font bold for distinguishing, distinguishing can also be set in different font colors.

For instance, in a form of a 16-disk all-anybay backboard, 16 pieces of nvme is required to be supported. The silkscreen layout diagram includes two adjacent longitudinal partitions on the left and right sides. In each longitudinal partition, the peripheral silkscreen included in the CPU are arranged vertically in parallel in the corresponding parts of the first arrangement and distribution and the second arrangement and distribution with different font colors.

For instance, 12 disks support a mode of 10 sata interfaces+2 anybay interfaces. Then, the silkscreen layout diagram includes 12 independent partitions arranged in three rows and four columns. Filling is performed with sata physical silkscreen indicated by the first arrangement and distribution in corresponding font colors in sequence in an order of 0-11. Then, for nvme physical silkscreen indicated by the second arrangement and distribution, independent partition where sata 10 and sata 1 are located are filled with 10 and 11 in the nvme silkscreen in sequence in different font colors.

For another instance, 9 disks support 7 sata interfaces+2 anybay interfaces. Then, the silkscreen layout diagram includes 9 independent partitions arranged in three rows and three columns. Filling is performed with sata physical silkscreen indicated by the first arrangement and distribution in corresponding font colors in sequence in an order of 0-8. Then, for nvme physical silkscreen indicated by the second arrangement and distribution, independent partition where sata 7 and sata 8 are located are filled with 10 and 8 in the nvme silkscreen in sequence in different font colors.

In addition, with the 16-disk all-anybay backboard as an instance, three cases of all sata, sata/nvme mixed insertion, and all nvme exist. If only sata is supported, nvme physical silkscreen exist such that operation and maintenance personnel may be misled. According to this situation, according to the design, another label is added in the silkscreen layout diagram. If there is a situation that only one type of hard disk is required to be mounted when an anybay backboard is shipped, SAS/SATA ONLY or NVME ONLY may be pasted according to a shipping situation. It is indicated that the current model supports only a single type of hard disk. This row of extra labels may not be attached during mixed insertion.

It can be understood that this label is optional. Pasting is performed according to the hard disk mounting situation, or pasting is not performed, which depends on requirements of a user.

According to an embodiment of the disclosure, when it is determined according to the configuration requirement information that only one hardware interface is configured in the server according to actual display requirements, a label partition is newly created below the silkscreen layout diagram to be filled with label content corresponding to the type of the currently configured hardware interface. When only one type of hard disk can be mounted during flexible selection and matching of hard disks, a new label is designed to be established below the silkscreen layout diagram to indicate that the current model only supports a single type of hard disks. The situation that operation and maintenance personnel is misled due to the existence of case silkscreen of other interfaces when only one interface is supported can be avoided.

Figure 6:
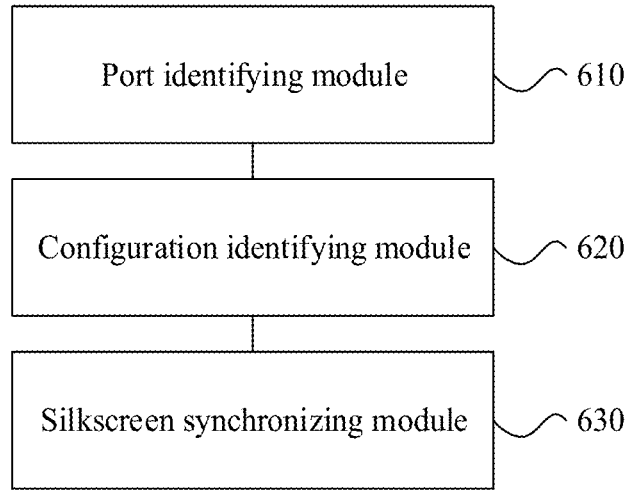
FIG. 6 is a schematic structural diagram of an apparatus for identifying peripheral configuration of server according to embodiments of the disclosure.

FIG. 6 is a schematic structural diagram of an apparatus for identifying peripheral configuration of server according to some embodiments of the disclosure. On the basis of any one of the above embodiments, as shown in FIG. 6, the apparatus for identifying peripheral configuration of server provided in an embodiment of the disclosure includes a port identifying module 610, a configuration identifying module 620, and a silkscreen synchronizing module 630.

The port identifying module 610 is configured to determine a PCIE external interface of each central processing unit on the basis of configuration requirement information of a server to be identified. The server to be identified is configured with an anybay hard disk interface. The configuration requirement information includes at least configuration information of the central processing unit and design requirement information of the hard disk interface.

A configuration identifying module 620 is configured to determine, in sequence according to a level state of each peripheral ID signal transmitted by each PCIE external interface, a peripheral type that is capable of being configured for a peripheral bandwidth corresponding to the peripheral ID signal, allocate corresponding serial numbers to peripherals of different peripheral types, and generate a peripheral silkscreen including all peripheral sequences managed by the server to be identified.

A silkscreen synchronizing module 630 is configured to send the peripheral silkscreen to a basic input output system and/or a baseboard management controller, and allow the basic input output system and/or the baseboard management controller to unify respective default silkscreen into the peripheral silkscreen.

In an embodiment, the port identifying module 610, the configuration identifying module 620, and the silkscreen synchronizing module 630 are electrically connected in sequence.

The port identifying module 610 determines PE ports of CPUs according to configuration requirement information corresponding to actual design requirements of the server to be identified.

The configuration identifying module 620 determines a peripheral type, peripheral bandwidth, and peripheral silkscreen to be allocated to the current CPU PE port in sequence according to the peripheral ID signal according to a predetermined mapping rule for the level state of each peripheral ID signal transmitted to each PE port, and integrates the peripheral type, peripheral bandwidth, and peripheral silkscreen identified by the peripheral ID signal of each PE port into peripheral configuration information corresponding to the PE port.

The silkscreen synchronizing module 630 transmits the peripheral configuration information to the BIOS, such that the BIOS unifies all BIOS silkscreen to be displayed on the SETUP interface into peripheral silkscreen in the peripheral configuration information.

Moreover, the apparatus for identifying peripheral configuration of server may transmit the peripheral configuration information to the BMC, such that the BMC unifies all BMC silkscreen displayed in a device list of a WEB interface into a peripheral silkscreen in the peripheral configuration information.

In an embodiment, the configuration identifying module 620 includes a configuration traversing unit, a peripheral allocating unit, and a silkscreen allocating unit.

The configuration traversing unit is configured to traverse design requirement information of each hard disk interface in all servers to be identified, and obtain a slot number and location of an anybay hard disk interface in each server to be identified, and a slot silkscreen of each server to be identified in the basic input output system.

The peripheral allocating unit is configured to determine, according to all peripheral ID signals transmitted in each server to be identified and through a corresponding relation between the peripheral ID signals and peripheral bandwidths, a peripheral type supported by each server to be identified.

The silkscreen allocating unit is configured to configure slot numbers of peripherals having peripheral types of non-transitory memory express (nvme) of all the servers to be identified from a target PCIE external interface of a target central processing unit. Configuring implementation steps are as follows:

a PCIE external interface set having N PCIE external interfaces is configured in sequence from the target PCIE external interface on the basis of slot numbers and locations of anybay hard disk interfaces in the servers to be identified.

Slot numbers of peripherals having peripheral types of nvme for each PCIE external interface in the PCIE external interface set are allocated as 0 to M in sequence, corresponding silkscreen templates are filled with the allocated slot numbers in sequence, and peripheral silkscreen of the peripherals having the peripheral types of nvme are generated.

In an embodiment, M is a positive integer, and M represents a number of nvme hard disks supported by a configuration that supports most nvme hard disks after configurations of all the servers to be identified are traversed. Moreover, N is a positive integer, and N represents a number of PCIE external interfaces of the central processing unit used by a configuration that supports most nvme hard disks after configurations of all servers are traversed. A corresponding relation between N and M is determined according to a number of buses of PCIE supported by each PCIE external interface of the central processing unit, and a value of N is deduced after a value of M is determined. A PCIE external interface set configured by a server to be identified and having fewer peripherals having peripheral types of nvme is a subset of a PCIE external interface set configured by a server to be identified and having more peripherals having peripheral types of nvme.

In an embodiment, the silkscreen allocating unit is configured to distribute the N PCIE external interfaces in the PCIE external interface set in the central processing units evenly.

In an embodiment, the apparatus further includes a bandwidth allocating module.

The bandwidth allocating module is configured to identify, in a case that it is determined two peripherals having a same peripheral bandwidth but different peripheral silkscreen exit at the currently identified PCIE external interface, the peripheral configuration according to peripheral ID signals transmitted by remaining PCIE external interfaces, and allocate a peripheral silkscreen to the currently identified PCIE external interface.

In an embodiment, the peripheral bandwidths are divided according to the peripheral types.

The peripheral types include an nvme hard disk corresponding to a peripheral bandwidth of x4, a riser hard disk corresponding to a peripheral bandwidth of x8, a riser hard disk or an open compute project (OCP) hard disk corresponding to a peripheral bandwidth of x16, and a null value.

In an embodiment, the peripheral silkscreen are determined according to the peripheral types.

The peripheral silkscreen include an nvme silkscreen corresponding to peripheral type nvme, and PCIE slot silkscreen corresponding to peripheral types other than the nvme.

The apparatus for identifying peripheral configuration of server provided in an embodiment of the disclosure is configured to execute the above method for identifying peripheral configuration of server in the disclosure. The embodiment thereof is consistent with the embodiment of the method for identifying peripheral configuration of server provided in the disclosure, and can achieve the same beneficial effects, which will not be described herein.

According to an embodiment of the disclosure, a distribution situation of PCIE external interfaces for central processing units is determined on the basis of configuration requirement information of the server. Through peripheral configuration information represented by a peripheral ID signal of each PCIE external interface in all the configurations, provider edge (PE) ports of each CPU are uniformly allocated to a same BIOS setup silkscreen and baseboard management controller (BMC) web silkscreen. Software silkscreen of a server having an anybay hard disk interface can be uniformly processed in cases of different models and configurations such that a situation that a software configuration is too complicated can be avoided. Even in the face of flexible requirements such as mixed insertion and configuration reduction of hard disks, the disclosure can be fully adapted, and efficiency and feasibility of peripheral configuration identification can be improved.

Figure 7:
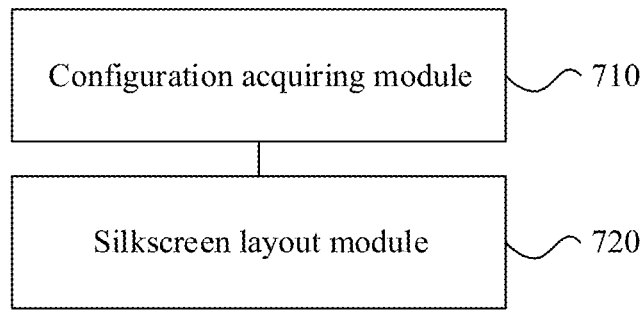
FIG. 7 is a schematic structural diagram of an apparatus for laying out peripheral silkscreen according to embodiments of the disclosure.

FIG. 7 is a schematic structural diagram of an apparatus for laying out peripheral silkscreen according to some embodiments of the disclosure. On the basis of any one of the above embodiments, as shown in FIG. 7, the apparatus for identifying peripheral configuration of server provided in an embodiment of the disclosure includes a configuration information acquiring module 710 and a silkscreen layout module 720.

The configuration information acquiring module 710 is configured to acquire peripheral configuration information of each PCIE external interface on the basis of the above method for identifying peripheral configuration of server.

The silkscreen layout module 720 is configured to generate a silkscreen distribution situation on the basis of a peripheral silkscreen carried in the peripheral configuration information of each PCIE external interface.

In an embodiment, the configuration information acquiring module 710 and the silkscreen layout module 720 are electrically connected in sequence.

The configuration information acquiring module 710 acquires identified peripheral configuration information of each PCIE external interface when the apparatus for identifying peripheral configuration of server executes the method for identifying peripheral configuration of server for a service to be identified.

The silkscreen layout module 720 extracts all peripheral silkscreen from the peripheral configuration information of each PCIE external interface, lays out the peripheral silkscreen on a display surface of a front end, and generates the silkscreen distribution situation.

The silkscreen distribution situation includes independent arrangement formed by arranging peripheral silkscreen of the same silkscreen type according to the slot number included therein.

In an embodiment, the silkscreen layout module 720 includes an arrangement and distribution submodule and a silkscreen layout submodule.

The arrangement and distribution submodule is configured to generate first arrangement and distribution and second arrangement and distribution in a horizontal direction on the basis of configuration requirement information of a server to be identified and an nvme silkscreen included in the peripheral silkscreen respectively.

The silkscreen layout submodule is configured to vertically splice the first arrangement and distribution and the second arrangement and distribution, and generate the silkscreen distribution situation.

In an embodiment, the arrangement and distribution submodule includes a distribution range determining unit, a first arrangement and distribution unit, and a second arrangement and distribution unit.

The distribution range determining unit is configured to determine a first distribution range and a second distribution range on the basis of the configuration requirement information.

The first arrangement and distribution unit is configured to carry out filling from 0 in sequence from left to right in the first distribution range, and generate the first arrangement and distribution.

The corresponding second arrangement and distribution unit is configured to fill the second distribution range with slot numbers in the nvme silkscreen in sequence from left to right, and generate the second arrangement and distribution.

The number of layout units included in the first distribution range is determined according to the total number of case slots included in the configuration requirement information. The initial layout unit of the second distribution range is vertically aligned with the target layout unit in the first distribution range. The target layout unit is determined according to the case slot corresponding to the first anybay hard disk interface in the server to be identified.

In an embodiment, the apparatus for identifying peripheral configuration of server further includes a silkscreen layout adjusting module and a printing module.

The silkscreen layout adjusting module is configured to generate a silkscreen layout diagram on the basis of the silkscreen distribution situation.

The printing module is configured to transmit the silkscreen layout diagram to a printing and outputting device, and allow the printing and outputting device to print and output the silkscreen layout diagram in a form of a label sticker.

The label sticker is used to be attached to a surface of a case ear plate of the server to be identified to indicate a peripheral configuration of the server to be identified.

In an embodiment, the silkscreen layout adjusting module includes a font color setting submodule, a first partition submodule and a first partition filling submodule.

The font color setting submodule is configured to set different font colors for the first arrangement and distribution and the second arrangement and distribution in the silkscreen distribution situation.

The first partition submodule is configured to generate, in a case that it is determined that the configuration requirement information indicates that all hardware interfaces in the server to be identified are anybay hard disk interfaces, longitudinal partitions corresponding, in number, to CPUs of the server to be identified in the canvas.

The first partition filling submodule is configured to fill the corresponding first arrangement and distribution and second arrangement and distribution with different font colors in each longitudinal partition, and generate the silkscreen layout diagram.

In an embodiment, the silkscreen layout adjusting module further includes a second partition submodule, a second partition filling submodule and a third partition filling submodule.

The second partition submodule is configured to generate, in a case that it is determined that the configuration requirement information indicates that at least one hardware interface in the server to be identified is not an anybay hard disk interface, independent partitions corresponding, in number, to layout units of the first arrangement and distribution in the canvas.

The second partition filling submodule is configured to fill the independent partitions with elements in the first arrangement and distribution in sequence after the font colors are set.

The third partition filling submodule is configured to fill the independent partitions from a target independent partition to a last independent partition with elements in the second arrangement and distribution in sequence after the font colors are set, and generate the silkscreen layout diagram.

The target independent partition is an independent partition corresponding to a target layout unit in the first arrangement and distribution.

In an embodiment, the silkscreen layout adjusting module further includes a label partition establishing submodule and a fourth partition filling submodule.

The label partition establishing submodule is configured to establish a label partition below the silkscreen layout diagram in a case that it is determined according to the configuration requirement information that the server to be identified is configured with only one hardware interface.

The fourth partition filling submodule is configured to set corresponding label content in the label partition according to a type of the configured hardware interface.

The apparatus for laying out peripheral silkscreen provided in an embodiment of the disclosure is configured to execute the above method for laying out peripheral silkscreen in the disclosure. The embodiment thereof is consistent with the embodiment of the method for laying out peripheral silkscreen provided in the disclosure, and can achieve the same beneficial effects, which will not be repeated herein.

According to an embodiment of the disclosure, according to the peripheral configuration information of each PCIE external interface identified on the basis of the apparatus for identifying peripheral configuration of server, the peripheral silkscreen of different silkscreen types in the peripheral configuration information are arranged independently in parallel. The peripheral silkscreen can perfectly correspond to BIOS silkscreen and hard disk location numbers in a device list of BMC WEB.

Figure 8:
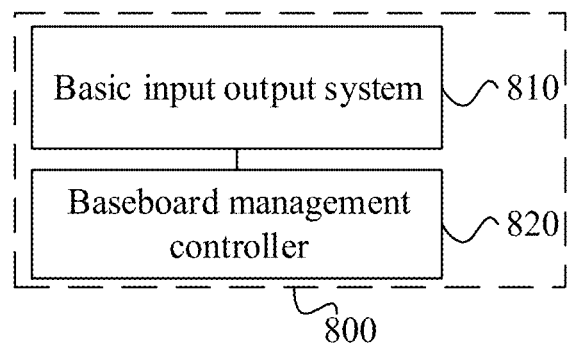
FIG. 8 is a schematic structural diagram of a server according to embodiments of the disclosure.

FIG. 8 is a schematic structural diagram of a server according to some embodiments of the disclosure. On the basis of any one of the above embodiments, as shown in FIG. 8, the server provided in an embodiment of the disclosure includes a server body 800. The server body 800 includes a basic input output system 810 and a baseboard management controller 820. The basic input output system 810 is configured to implement the above method for identifying peripheral configuration of server.

The baseboard management controller 820 is configured to receive peripheral configuration information identified by the basic input output system 810, and carry out unification by using a peripheral silkscreen carried in the peripheral configuration information.

In an embodiment, the server is constituted by at least a basic input output system 810 and a baseboard management controller 820.

The basic input output system 810 determines the peripheral bandwidth to be allocated to the current CPU PE port and the peripheral configuration information such as related silkscreen according to the state of the peripheral ID signal for flexible requirements such as mixed insertion and configuration reduction of hard disks according to actual service situations of the user. After the peripheral configuration is identified, the BIOS unifies all BIOS silkscreen to be displayed on the SETUP interface into peripheral silkscreen in the peripheral configuration information. Moreover, the obtained peripheral configuration information is also transmitted to the baseboard management controller 820.

The baseboard management controller 820 unifies all BMC silkscreen displayed in a device list of a WEB interface into a peripheral silkscreen in the peripheral configuration information, to print location information of a device on the WEB interface for software and hardware corresponding.

According to an embodiment of the disclosure, a distribution situation of PCIE external interfaces for central processing units is determined on the basis of configuration requirement information of the server. Through peripheral configuration information represented by a peripheral ID signal of each PCIE external interface in all the configurations, provider edge (PE) ports of each CPU are uniformly allocated to a same BIOS setup silkscreen and baseboard management controller (BMC) web silkscreen. Software silkscreen of a server having an anybay hard disk interface can be uniformly processed in cases of different models and configurations such that a situation that a software configuration is too complicated can be avoided. Even in the face of flexible requirements such as mixed insertion and configuration reduction of hard disks, the disclosure can be fully adapted, and efficiency and feasibility of peripheral configuration identification can be improved.

Figure 9:
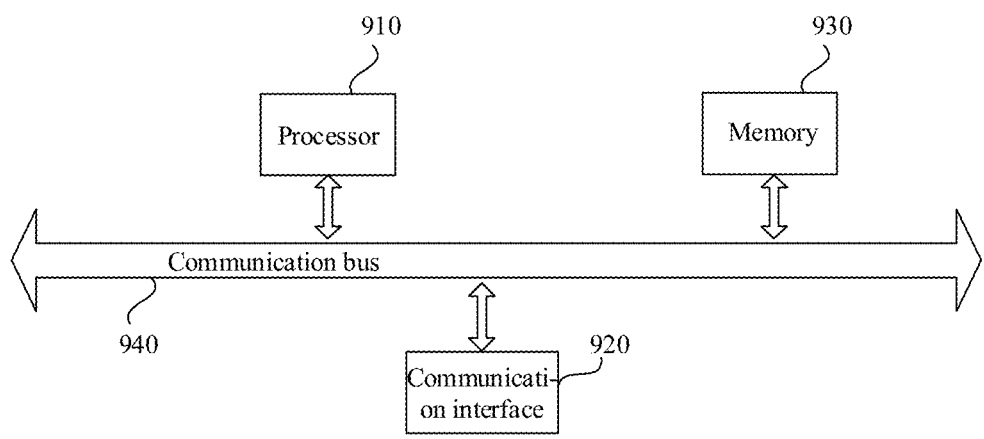
FIG. 9 is a schematic structural diagram of an electronic device according to embodiments of the disclosure.

FIG. 9 is a schematic structural diagram of an electronic device according to some embodiments of the disclosure. As shown in FIG. 9, the electronic device may include a processor 910, a communications interface 920, a memory 930 and a communication bus 940. The processor 910, the communications interface 920 and the memory 930 complete communication with each other through the communication bus 940. The processor 910 may call logic instructions in the memory 930 to execute a method for identifying peripheral configuration of server. The method includes: a PCIE external interface of each CPU is determined on the basis of configuration requirement information of a server to be identified; peripheral configuration information of the PCIE external interface is determined on the basis of a peripheral ID signal transmitted by each PCIE external interface; the peripheral configuration information is sent to the basic input output system and/or the baseboard management controller, and the basic input output system and/or the baseboard management controller are allowed to unify respective default silkscreen into the peripheral silkscreen carried in the peripheral configuration information. The server to be identified is configured with an anybay hard disk interface. The configuration requirement information includes at least configuration information of the central processing unit and design requirement information of the hard disk interface. The peripheral configuration information includes a peripheral bandwidth, a peripheral type, and a peripheral silkscreen of at least one peripheral. A method for laying out peripheral silkscreen may also be executed. The method includes: peripheral configuration information of each PCIE external interface is acquired on the basis of any one of the method for identifying peripheral configuration of server; and a silkscreen distribution situation is generated on the basis of a peripheral silkscreen carried in the peripheral configuration information of each PCIE external interface.

In addition, the logic instruction in the above memory 930 may be implemented as a software functional unit and stored in a non-transitory readable storage medium when sold or used as a stand-alone product. On the basis of such understanding, a technical solution of the disclosure may be embodied in the form of software products in essence or in part that contributes to the related art or in part. The computer software product is stored in a non-transitory readable storage medium, and includes several instructions to cause one computer device (which may be a personal computer, a server, a network device, etc.) to execute all or some steps of the method in each embodiment of the disclosure. The foregoing non-transitory readable storage medium includes various media capable of storing program codes, such as a universal serial bus (USB) flash drive, a removable hard disk, a read-only memory (ROM), a random access memory (RAM), a magnetic disk, and an optical disk.

In another aspect, the disclosure further provides a computer program product. The computer program product includes a computer program. The computer program may be stored on a non-transitory readable storage medium. When the computer program is executed by a processor, a computer can execute the method for identifying peripheral configuration of server provided in each of the above embodiments. The method includes: a PCIE external interface of each central processing unit is determined on the basis of configuration requirement information of a server to be identified. The server to be identified is configured with an anybay hard disk interface. The configuration requirement information includes at least configuration information of the central processing unit and design requirement information of the hard disk interface. A peripheral type that is capable of being configured for a peripheral bandwidth corresponding to the peripheral ID signal is determined in sequence according to a level state of each peripheral ID signal transmitted by each PCIE external interface, corresponding serial numbers are allocated to peripherals of different peripheral types, and a peripheral silkscreen including all peripheral sequences managed by the server to be identified is generated. The peripheral silkscreen is sent to a basic input output system and/or a baseboard management controller, and the basic input output system and/or the baseboard management controller are allowed to unify respective default silkscreen into the peripheral silkscreen. A method for laying out peripheral silkscreen may also be executed. The method includes: peripheral configuration information of each PCIE external interface is acquired on the basis of any one of the method for identifying peripheral configuration of server; and a silkscreen distribution situation is generated on the basis of a peripheral silkscreen carried in the peripheral configuration information of each PCIE external interface.

In another aspect, the disclosure further provides a non-transitory readable storage medium. The non-transitory readable storage medium stores a computer program. When the computer is executed by a processor, the method for identifying peripheral configuration of server provided in each of the above embodiments can be executed. The method includes: a PCIE external interface of each central processing unit is determined on the basis of configuration requirement information of a server to be identified. The server to be identified is configured with an anybay hard disk interface. The configuration requirement information includes at least configuration information of the central processing unit and design requirement information of the hard disk interface. A peripheral type that is capable of being configured for a peripheral bandwidth corresponding to the peripheral ID signal is determined in sequence according to a level state of each peripheral ID signal transmitted by each PCIE external interface, corresponding serial numbers are allocated to peripherals of different peripheral types, and a peripheral silkscreen including all peripheral sequences managed by the server to be identified is generated. The peripheral silkscreen is sent to a basic input output system and/or a baseboard management controller, and the basic input output system and/or the baseboard management controller are allowed to unify respective default silkscreen into the peripheral silkscreen. A method for laying out peripheral silkscreen may also be executed. The method includes: peripheral configuration information of each PCIE external interface is acquired on the basis of any one of the method for identifying peripheral configuration of server; and a silkscreen distribution situation is generated on the basis of a peripheral silkscreen carried in the peripheral configuration information of each PCIE external interface.

The apparatus embodiment described above is merely schematic, where the unit described as a separate component may or may not be physically separated, and a component displayed as a unit may or may not be a physical unit, that is, the component may be located at one place, or distributed on a plurality of network units. Some or all of modules can be selected according to actual requirements to achieve the objective of the solution of the embodiment. Those of ordinary skill in the art can understand and implement the disclosure without making creative efforts.

From the description of the above embodiments, those skilled in the art can clearly understand that the embodiments may be implemented by software plus a necessary general-purpose hardware platform, and certainly may also be implemented by hardware. On the basis of the understanding, the above technical solution may be embodied in a form of a software product in essence or a part contributing to the related art. The computer software product is stored in a non-transitory readable storage medium, such as a ROM/

RAM, a magnetic disk and an optical disk, and includes several instructions to cause a terminal device (which may be a personal computer, a server, a network device, etc.) to execute the method of the embodiments or some parts of the embodiments of the disclosure.

Finally, it should be noted that the above embodiments are merely used for describing the technical solutions of the disclosure, rather than limiting same. Although the disclosure is described in detail with reference to the foregoing embodiments, those of ordinary skill in the art should understand that they still can modify the technical solutions described in the foregoing embodiments, or equivalently replace some of the technical features. Moreover, these modifications or substitutions do not cause the essence of the corresponding technical solutions to deviate from the spirit and scope of the technical solutions of all embodiments of the disclosure.

What is claimed is:

1. A method for identifying peripheral configuration of server, comprising:
   determining, on the basis of configuration requirement information of a server to be identified, a peripheral component interconnect express (PCIE) external interface of each central processing unit, wherein the server to be identified is configured with an anybay hard disk interface; and the configuration requirement information comprises at least configuration information of the central processing unit and design requirement information of the hard disk interface;
   determining, in sequence according to a level state of each peripheral identity (ID) signal transmitted by each PCIE external interface, a peripheral type that is capable of being configured for a peripheral bandwidth corresponding to the peripheral ID signal, allocating corresponding serial numbers to peripherals of different peripheral types, and generating a peripheral silkscreen comprising peripheral sequences of all the peripherals managed by the server to be identified; and sending the peripheral silkscreen to a basic input output system and/or a baseboard management controller, and allowing the basic input output system and/or the baseboard management controller to unify respective default silkscreen into the peripheral silkscreen.

2. The method for identifying peripheral configuration of server according to claim 1, wherein the determining, in sequence according to a level state of each peripheral ID signal transmitted by each PCIE external interface, a peripheral type that is capable of being configured for a peripheral bandwidth corresponding to the peripheral ID signal, allocating corresponding serial numbers to peripherals of different peripheral types, and generating a peripheral silkscreen comprising peripheral sequences of all the peripherals managed by the server to be identified comprises:
   obtaining, by traversing design requirement information of hard disk interfaces in all servers to be identified, a slot number and location of an anybay hard disk interface in each server to be identified, and a slot silkscreen of each server to be identified in the basic input output system;
   determining, according to all peripheral ID signals transmitted in each server to be identified and through a corresponding relation between the peripheral ID signals and peripheral bandwidths, a peripheral type supported by each server to be identified;
   configuring, from a target PCIE external interface of a target central processing unit, slot numbers of peripherals having peripheral types of non-transitory memory express (nvme) of all the servers to be identified, wherein configuring implementation steps are as follows:
   configuring, on the basis of slot numbers and locations of anybay hard disk interfaces in the servers to be identified, a PCIE external interface set having N PCIE external interfaces in sequence from the target PCIE external interface; and
   allocating, for each PCIE external interface in the PCIE external interface set as 0 to M in sequence, slot numbers of peripherals having peripheral types of nvme, filling corresponding silkscreen templates with the allocated slot numbers in sequence, and generating peripheral silkscreen of the peripherals having the peripheral types of nvme; wherein
   M is a positive integer, and M represents a number of nvme hard disks supported by a configuration that supports most nvme hard disks after configurations of all the servers to be identified are traversed; N is a positive integer, and N represents a number of PCIE external interfaces of the central processing unit used by a configuration that supports most nvme hard disks after configurations of all servers are traversed; a corresponding relation between N and M is determined according to a number of buses of PCIE supported by each PCIE external interface of the central processing unit, and a value of N is deduced after a value of M is determined; and a PCIE external interface set configured by a server to be identified and having fewer peripherals having peripheral types of nvme is a subset of a PCIE external interface set configured by a server to be identified and having more peripherals having peripheral types of nvme.

3. The method for identifying peripheral configuration of server according to claim 2, wherein the configuring, on the basis of slot numbers and locations of anybay hard disk interfaces in the servers to be identified, a PCIE external interface set having N PCIE external interfaces in sequence from the target PCIE external interface comprises:
   distributing, in the central processing units evenly, the N PCIE external interfaces in the PCIE external interface set.

4. The method for identifying peripheral configuration of server according to claim 1, wherein after the peripheral ID signal transmitted by each PCIE external interface is received, the method further comprises:
   identifying, in a case that it is determined according to a peripheral ID signal transmitted by a currently identified PCIE external interface that two peripherals having a same peripheral bandwidth but different peripheral silkscreen exit at the currently identified PCIE external interface, the peripheral configuration according to peripheral ID signals transmitted by remaining PCIE external interfaces, and allocating peripheral silkscreen to the currently identified PCIE external interface.

5. The method for identifying peripheral configuration of server according to claim 1, wherein the peripheral bandwidths are divided according to the peripheral types; and
   the peripheral types comprise an nvme hard disk corresponding to a peripheral bandwidth of x4, a riser hard disk corresponding to a peripheral bandwidth of x8, a riser hard disk or an open compute project (OCP) hard disk corresponding to a peripheral bandwidth of x16, and a null value.

6. The method for identifying peripheral configuration of server according to claim 5, wherein the peripheral silkscreen are determined according to the peripheral types; and the peripheral silkscreen comprise an nvme silkscreen corresponding to peripheral type nvme, and PCIE slot silkscreen corresponding to peripheral types other than the nvme.

7. A method for laying out peripheral silkscreen, comprising:

acquiring, on the basis of the method for identifying peripheral configuration of server according to claim 1, peripheral configuration information of each PCIE external interface; and generating, on the basis of a peripheral silkscreen carried in the peripheral configuration information of each PCIE external interface, a silkscreen distribution situation.

8. The method for laying out peripheral silkscreen according to claim 7, wherein the generating, on the basis of a peripheral silkscreen carried in the peripheral configuration information of each PCIE external interface, a silkscreen distribution situation comprises:

generating, on the basis of configuration requirement information of a server to be identified and an nvme silkscreen comprised in the peripheral silkscreen respectively, first arrangement and distribution and second arrangement and distribution in a horizontal direction; and generating, by splicing the first arrangement and distribution and the second arrangement and distribution vertically, the silkscreen distribution situation.

9. The method for laying out peripheral silkscreen according to claim 8, wherein the generating, by splicing the first arrangement and distribution and the second arrangement and distribution vertically, the silkscreen distribution situation comprises:

generating, by splicing the first arrangement and distribution and the second arrangement and distribution vertically in parallel, right-aligning the first arrangement and distribution and the second arrangement and distribution, the silkscreen distribution situation.

10. The method for laying out peripheral silkscreen according to claim 8, wherein the generating, on the basis of configuration requirement information of a server to be identified and an nvme silkscreen comprised in the peripheral silkscreen respectively, first arrangement and distribution and second arrangement and distribution in a horizontal direction comprises:

determining, on the basis of the configuration requirement information, a first distribution range and a second distribution range;

generating, by carrying out filling from 0 in sequence from left to right in the first distribution range, the first arrangement and distribution; and generating, by filling the second distribution range with slot numbers in the nvme silkscreen in sequence from left to right, the second arrangement and distribution; wherein a number of layout units comprised in the first distribution range is determined according to a total number of case slots corresponding to anybay hard disk interfaces; an initial layout unit of the second distribution range is vertically aligned with a target layout unit in the first distribution range; and the target layout unit is determined according to a case slot corresponding to a first anybay hard disk interface in the server to be identified.

11. The method for laying out peripheral silkscreen according to claim 10, wherein the determining, on the basis of the configuration requirement information, a first distribution range and a second distribution range comprises:

establishing, on the basis of a number of case slots carried in the configuration requirement information and a hard disk type supported by each case slot, a corresponding number of continuous layout units in a horizontal direction of a canvas correspondingly, and forming the first distribution range, wherein each layout unit in the first distribution range is used to indicate whether a corresponding case slot supports a serial attached SCSI (SAS) hard disk or a serial advanced technology attachment (SATA) hard disk; and determining, according to an order of the case slot in which the first anybay hard disk interface is located in the configuration requirement information, a target layout unit in the first distribution range, starting to establish a corresponding number of continuous layout units right below the target layout unit, and forming the second distribution range, wherein each layout unit in the second distribution range is used to indicate whether a corresponding case slot supports an nvme hard disk.

12. The method for laying out peripheral silkscreen according to claim 8, wherein after the generating, on the basis of a peripheral silkscreen carried in the peripheral configuration information of each PCIE external interface, a silkscreen distribution situation, the method further comprises:

generating, on the basis of the silkscreen distribution situation, a silkscreen layout diagram; and transmitting, to a printing and outputting device, the silkscreen layout diagram, and allowing the printing and outputting device to print and output the silkscreen layout diagram in a form of a label sticker; wherein the label sticker is used to be attached to a surface of a case ear plate of the server to be identified to indicate a peripheral configuration of the server to be identified.

13. The method for laying out peripheral silkscreen according to claim 12, wherein the generating, on the basis of the silkscreen distribution situation, a silkscreen layout diagram comprises:

setting, in the silkscreen distribution situation, different font colors for the first arrangement and distribution and the second arrangement and distribution;

generating, in a case that it is determined that the configuration requirement information indicates that all hardware interfaces in the server to be identified are anybay hard disk interfaces, longitudinal partitions corresponding, in number, to central processing units (CPUs) of the server to be identified in the canvas; and filling, in each longitudinal partition, the corresponding first arrangement and distribution and second arrangement and distribution with different font colors, and generating the silkscreen layout diagram.

14. The method for laying out peripheral silkscreen according to claim 13, wherein after the setting, in the silkscreen distribution situation, different font colors for the first arrangement and distribution and the second arrangement and distribution, the method further comprises:

generating, in a case that it is determined that the configuration requirement information indicates that at least one hardware interface in the server to be identified is not an anybay hard disk interface, independent partitions corresponding, in number, to layout units of the first arrangement and distribution in the canvas;

filling, in the first arrangement and distribution in sequence after the font colors are set, the independent partitions with elements; and filling, from a target independent partition to a last independent partition with elements in the second arrangement and distribution in sequence after the font colors are set, the independent partitions, and generating the silkscreen layout diagram; wherein the target independent partition is an independent partition corresponding to a target layout unit in the first arrangement and distribution.

15. The method for laying out peripheral silkscreen according to claim 12, wherein after the generating, on the basis of the silkscreen distribution situation, a silkscreen layout diagram, the method further comprises:

establishing, in a case that it is determined according to the configuration requirement information that the server to be identified is configured with only one hardware interface, a label partition below the silkscreen layout diagram; and setting, according to a type of the configured hardware interface, corresponding label content in the label partition.

16. A server, comprising a server body, wherein the server body comprises a basic input output system and a baseboard management controller, and the basic input output system is configured to implement the following operations:

determining, on the basis of configuration requirement information of a server to be identified, a peripheral component interconnect express (PCIE) external interface of each central processing unit, wherein the server to be identified is configured with an anybay hard disk interface; and the configuration requirement information comprises at least configuration information of the central processing unit and design requirement information of the hard disk interface;

determining, in sequence according to a level state of each peripheral identity (ID) signal transmitted by each PCIE external interface, a peripheral type that is capable of being configured for a peripheral bandwidth corresponding to the peripheral ID signal, allocating corresponding serial numbers to peripherals of different peripheral types, and generating a peripheral silkscreen comprising all peripheral sequences of all the peripherals managed by the server to be identified; and sending the peripheral silkscreen to a basic input output system and/or a baseboard management controller, and allowing the basic input output system and/or the baseboard management controller to unify respective default silkscreens into the peripheral silkscreen;

and the baseboard management controller is configured to receive peripheral configuration information identified by the basic input output system, and carry out unification by using a peripheral silkscreen carried in the peripheral configuration information.

17. An electronic device, comprising a memory, a processor and a computer program stored in the memory and operable on the processor, wherein when the processor executes the program to implement the method for identifying peripheral configuration of server according to claim 1.

18. A non-transitory readable storage medium, storing a computer program, wherein when the computer program is executed by a processor to implement the method for identifying peripheral configuration of server according to claim 1.

19. The server according to claim 16, wherein the determining, in sequence according to a level state of each peripheral ID signal transmitted by each PCIE external interface, a peripheral type that is capable of being configured for a peripheral bandwidth corresponding to the peripheral ID signal, allocating corresponding serial numbers to peripherals of different peripheral types, and generating a peripheral silkscreen comprising all peripheral sequences of all the peripherals managed by the server to be identified, the basic input output system is configured to implement the following operations:

obtaining, by traversing design requirement information of hard disk interfaces in all servers to be identified, a slot number and location of an anybay hard disk interface in each server to be identified, and a slot silkscreen of each server to be identified in the basic input output system;

determining, according to all peripheral ID signals transmitted in each server to be identified and through a corresponding relation between the peripheral ID signals and peripheral bandwidths, a peripheral type supported by each server to be identified;

configuring, from a target PCIE external interface of a target central processing unit, slot numbers of peripherals having peripheral types of non-volatile memory express (nvme) of all the servers to be identified, wherein configuring implementation steps are as follows:

configuring, on the basis of slot numbers and locations of anybay hard disk interfaces in the servers to be identified, a PCIE external interface set having N PCIE external interfaces in sequence from the target PCIE external interface; and allocating, for each PCIE external interface in the PCIE external interface set as 0 to M in sequence, slot numbers of peripherals having peripheral types of nvme, filling corresponding silkscreen templates with the allocated slot numbers in sequence, and generating peripheral silkscreen of the peripherals having the peripheral types of nvme; wherein M is a positive integer, and M represents a number of nvme hard disks supported by a configuration that supports most nvme hard disks after configurations of all the servers to be identified are traversed; N is a positive integer, and N represents a number of PCIE external interfaces of the central processing unit used by a configuration that supports most nvme hard disks after configurations of all servers are traversed; a corresponding relation between N and M is determined according to a number of buses of PCIE supported by each PCIE external interface of the central processing unit, and a value of N is deduced after a value of M is determined; and a PCIE external interface set configured by a server to be identified and having fewer peripherals having peripheral types of nvme is a subset of a PCIE external interface set configured by a server to be identified and having more peripherals having peripheral types of nvme.

20. The server according to claim 16, wherein after the peripheral ID signal transmitted by each PCIE external interface is received, the basic input output system is further configured to implement the following operations:

identifying, in a case that it is determined according to a peripheral ID signal transmitted by a currently identified PCIE external interface that two peripherals having a same peripheral bandwidth but different peripheral silkscreen exit at the currently identified PCIE external interface, the peripheral configuration according to peripheral ID signals transmitted by remaining PCIE external interfaces, and allocating peripheral silkscreen to the currently identified PCIE external interface.

* * * * *